(12) United States Patent
Sandler et al.

(10) Patent No.: US 11,004,135 B1
(45) Date of Patent: May 11, 2021

(54) ARTIFICIAL INTELLIGENCE SYSTEM FOR BALANCING RELEVANCE AND DIVERSITY OF NETWORK-ACCESSIBLE CONTENT

(71) Applicant: Amazon Technologies, Inc., Seattle, WA (US)

(72) Inventors: Samuel Theodore Sandler, Seattle, WA (US); Karthik Mohan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 574 days.

(21) Appl. No.: 15/681,109

(22) Filed: Aug. 18, 2017

(51) Int. Cl.
G06Q 30/06 (2012.01)
G06N 3/08 (2006.01)
G06N 3/04 (2006.01)

(52) U.S. Cl.
CPC ........... *G06Q 30/0631* (2013.01); *G06N 3/04* (2013.01); *G06N 3/08* (2013.01); *G06Q 30/0603* (2013.01)

(58) Field of Classification Search
CPC .. G06Q 30/0631; G06Q 30/0603; G06N 3/04; G06N 3/08
USPC ...................................................... 705/26.7
See application file for complete search history.

(56) References Cited

U.S. PATENT DOCUMENTS

| | | | |
|---|---|---|---|
| 6,615,208 B1* | 9/2003 | Behrens | G06Q 30/0631 707/754 |
| 8,301,623 B2 | 10/2012 | Chakrabarti | |
| 9,881,226 B1* | 1/2018 | Rybakov | G06K 9/46 |
| 10,290,040 B1* | 5/2019 | Misra | H04L 67/22 |
| 2009/0132459 A1 | 5/2009 | Hicks | |
| 2012/0265744 A1* | 10/2012 | Berkowitz | G06Q 30/06 707/705 |
| 2014/0067596 A1* | 3/2014 | McGovern | G06Q 30/0246 705/26.7 |
| 2017/0243244 A1* | 8/2017 | Trabelsi | G06Q 30/0255 |
| 2018/0075137 A1* | 3/2018 | Lifar | G06F 16/337 |
| 2018/0181569 A1* | 6/2018 | Jarr | G06F 16/5838 |

(Continued)

OTHER PUBLICATIONS

Castro-Schez, J., Miguel, R., Vallejo, D. and Lopez-Lopez, L.M., A highly adaptive recommender system based on fuzzy logic for B2C e-commerce portals, Mar. 2011, Expert Systems with Applications, 38(3), pp. 2441-2454. (Year: 2011).*

(Continued)

*Primary Examiner* — Jason B Dunham
*Assistant Examiner* — Brittany E Bargeon
(74) *Attorney, Agent, or Firm* — Knobbe, Martens, Olson & Bear, LLP

(57) ABSTRACT

The present disclosure is directed to training, and providing recommendations via, a machine learning model architected to balance relevance and diversity of sets of recommendations. For example, a neural network can be provided with user profile features and can output probabilities for each of a number of recommendations. This can be converted into a ranked list of recommendations. The ranked list of recommendations is provided to a diversity model that maximizes an optimization objective having a first objective that quantifies relevance of a recommendation and a second objective that measures diversity of a set of recommendations. The output of the diversity model is a set of recommendations that have both high relevance and high diversity.

14 Claims, 8 Drawing Sheets

(56) References Cited

U.S. PATENT DOCUMENTS

2018/0300757 A1* 10/2018 Saxena .............. G06Q 30/0255
2018/0341955 A1* 11/2018 Amarthaluri ........ G06Q 10/087

OTHER PUBLICATIONS

Chapelle, et al, *Large-scale validation and analysis of interleaved search evaluation*, ACM Transactions on Information Systems, 30(1):1-41 (2012).
Desautels, et al, *Parallelizing Exploration—Exploitation Tradeoffs with Gaussian Process Bandit Optimization*, JMLR 15:4053-4103 (2014).
Horn and Johnson, eds., *Matrix Analysis Second Edition*, Cambridge University Press (2013).
Kulesza, et al, *Determinantal Point Processes for Machine Learning*, Foundations and Trends in Machine Learning: 5:2-3, 2012.
Kulesza, et al, *k-DPPS: Fixed-Size Determinantal Point Process*, International Conference on Machine Learning (ICML), Bellevue, WA, Jun. 2011.
Linden, et al, *Industry Report: Amazon.com Recommendations: Item-to-Item Collaborative Filtering*, IEEE Internet Computing 1-79 (2003).
Nemhauser, et al, *An Analysis of Approximations for Maximizing Submolar Set Functions—I*, Mathematical Programming 14:265-294 (1978).
Teo, et al, *Adaptive, Personalized Diversity for Visual Discovery*, RecSys '16 Sep. 15-19, 2016, Boston, MA, USA DOI: http://dx.doi.org/10.1145/2959100.2959171.

* cited by examiner

ARTIFICIAL INTELLIGENCE SYSTEM FOR BALANCING RELEVANCE AND DIVERSITY OF NETWORK-ACCESSIBLE CONTENT

BACKGROUND

Some web sites and other types of interactive systems implement services for generating customized content suggestions for items stored or represented in a data repository. One common application for such services involves suggesting products for purchase, rental, subscription, viewing, or some other form of consumption. For example, some e-commerce web sites provide services for suggesting products to users based on their respective purchase histories, rental histories, product viewing histories, or item ratings. Such services are also used to suggest web sites, news articles, users, music and video files, and other types of items.

Computer learning models can process large volumes of user and item interaction data to provide relevant recommendations for users. For example, a model may be implemented as an artificial neural network. Artificial neural networks are artificial in the sense that they are computational entities, implemented by computing devices.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1A:
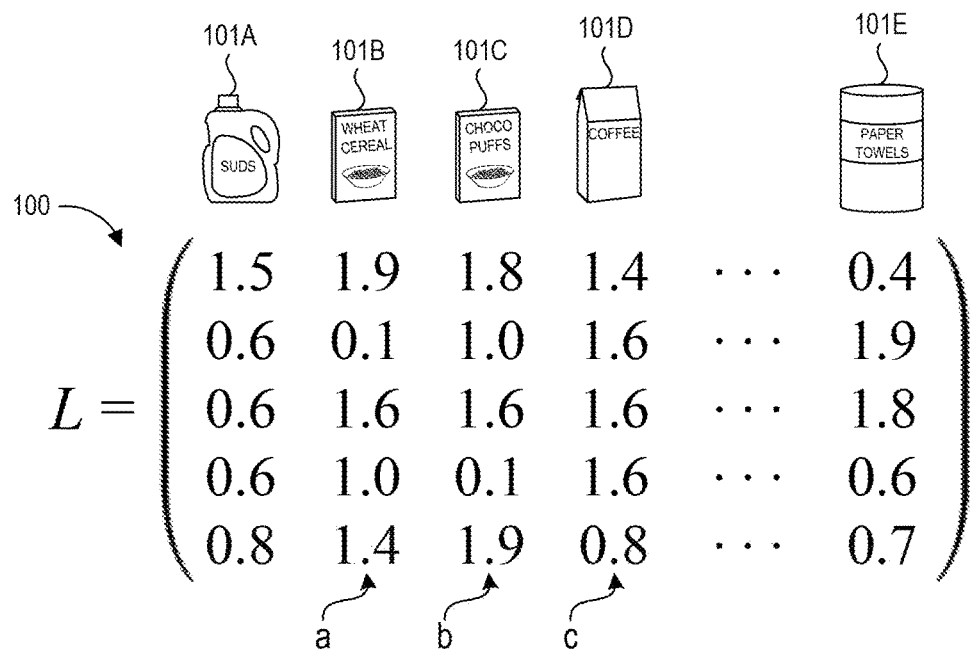
FIGS. 1A-1B illustrate example vector representations of items.

The present disclosure is directed to an artificial intelligence system that generates and uses machine learning models, and specifically to a system that balances both the relevance and the diversity of a set of customized content suggestions. For example, in the context of an electronic catalog of items (e.g., products or services), one service offered to users may be a "pantry" section of the catalog that offers a selection of consumable goods including pantry items, food items, toiletries, cosmetics, cleaning products, and other items that deplete over time. Much like traditional grocery-store shopping, users may periodically access the pantry section of the electronic catalog to stock up on a variety of consumable goods. Relevance-based recommendations tend to output groupings of similar items—for example multiple flavors of the same brand of chips, variations of laundry detergents, or different types of bottled water—in response to cues that the user is interested in a particular type of item. However, such homogenous recommendations are not well suited to the "cart-filling" shopping habits of users buying consumable items, as they require users to instead manually search the catalog to select the desired variety of items.

Further, recommendation engines are typically constrained in the number of items they can present to users. For visually-presented recommendations, device screen real estate is limited on mobile and tablet devices. Even on larger computing devices like laptops and desktops, recommendation engines typically present their recommendations within carousels of limited length. As such, recommendation engines have a limited number of recommendations they can present to try to catch the interest of the user. Voice-based shopping, for example via automated home assistant devices, can be even more constrained. Each item presented auditorily to the user requires a few seconds of their attention, and particularly if a user is rushed or multi-tasking, the recommendation engine has only a few chances to provide a good recommendation before the user loses interest. If the top "relevant" recommendations all relate to variations of the same product, and the user is not actually interested in that product, then the recommendation engine will likely lose the interest of the user before they are presented with a more interesting recommendation. To reduce the risk that a user finds nothing of interest and moves on, recommendations should therefore be both diverse as well as relevant.

The aforementioned problems, among others, are addressed in some embodiments by the disclosed recommendation engine including a machine learning system having an architecture that balances the relevance and diversity tradeoff. To achieve this balance, the architecture of the machine learning system includes a relevance model trained to identify particular items of relevance to a particular user, even in scenarios where that user has little or no associated behavioral history. The architecture of the machine learning system also includes a diversity model that selects and orders a diverse subset of the identified relevant items for presentation to the user.

One implementation of the disclosed relevance model includes a feedforward neural network architecture with an input feature set that includes a variety of features in order to make the network robust to the "cold start" problem (e.g., where a user has little or no associated behavioral data/purchase data). In the context of the pantry catalog, there can be a range of thousands of different input features including pantry catalog items purchased by a user, consumable items from other areas of the electronic catalog outside the pantry catalog that were purchased by the user, the brands of past purchases, item-type keywords of the past purchases, departments of products previously bought by the user, and high-level product categories such as general ledger categories of the products previously bought by the user. By including this set of coarse-grain features, rather than limiting input features to just purchase history, the neural network architecture alleviates data sparsity and helps the recommendation engine provide recommendations to first time users of the pantry catalog. Thus, the relevance model can be considered to be "regularized." Regularization, in mathematics and statistics and particularly in the fields of machine learning and inverse problems, is a process of introducing additional information in order to solve an ill-posed problem or to prevent overfitting.

For example, first time users of the pantry catalog are likely to have made purchases from other parts of the larger electronic catalog, and in particular in consumable categories like household items and grocery items. The disclosed architecture leverages these other signals to address the cold start problem of providing these users with recommendations. Once trained, the features associated with a particular user can be fed through the trained neural network to obtain relevance scores for each of a number of items available in the pantry catalog. The pantry catalog can be considered as a subset or part of the larger electronic catalog featuring its own set of items, some of which may be available as well through the larger electronic catalog. As such, the pantry catalog can be viewed as a compartmentalized subset or a different catalog from the larger electronic catalog. Though described in the context of a pantry catalog and larger electronic catalog, the disclosed relevance score determinations can also be applied to other first and second catalogs, where the first catalog is a subset of the second catalog or a completely different catalog. At least some items in the first and second catalogs can share common attributes such that the first and second catalogs are related, and user interactions with one may be predictive of user interactions with the other.

One implementation of the disclosed diversity model is a submodular function that uses a maximization objective to a highly diverse subset of a certain number of the items with the highest relevance scores. The disclosed formulation of the objective draws from multiple mathematical models, including determinantal point processes and non-myopic Bayesian optimization, with modifications to improve computational efficiency. The diversity model is submodular in that the difference in the incremental value of the function made by addition of a single element to a set decreases as the size of the set increases. For example, adding a third diverse item to a set of two items increases the set's overall diversity more than adding a thirtieth diverse item to a set of twenty nine items. However, rather than explicitly positing that each addition of a product in a previously selected category yields diminished returns, the diversity model promotes diversity by preferring sets of items whose volume, or spread, in a feature space is large.

Figure 1B:
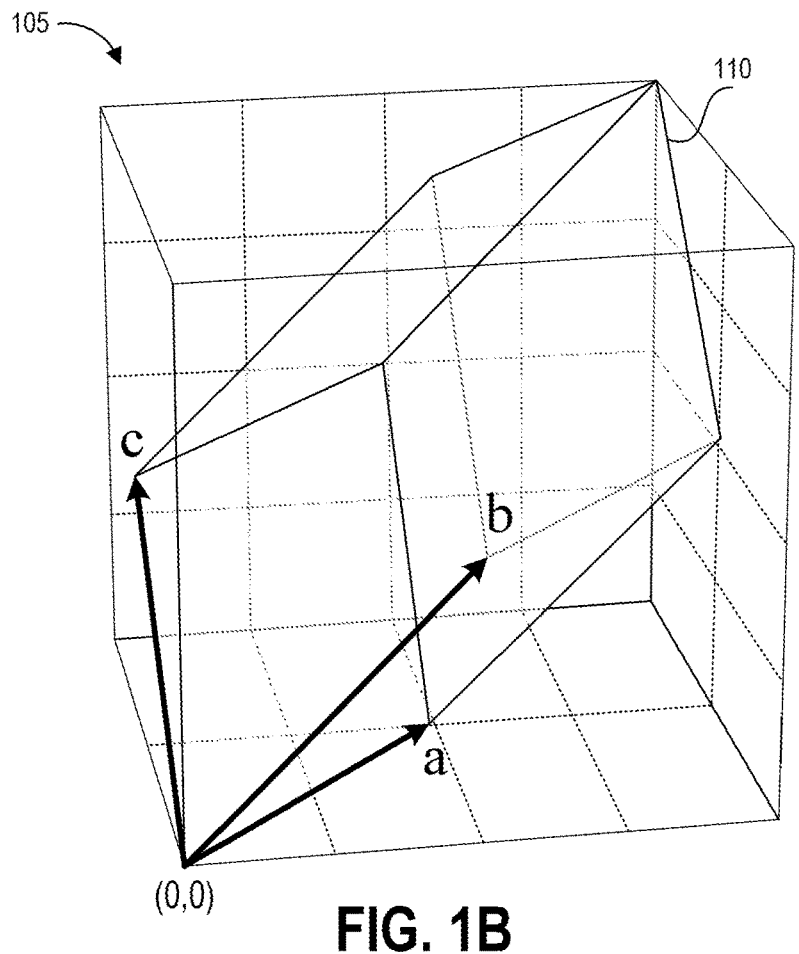

The diversity model can operate on latent vector representations of the items in order to evaluate their volume in product feature space. Beneficially, this can enable the diversity model to still operate on items for which no descriptive catalog metadata is available, for example newly uploaded content. To illustrate, consider the example shown in FIGS. 1A-1D. FIGS. 1A and 1B graphically depict the concepts of item vector representations and the volume occupied by these vectors in product feature space. FIG. 1A illustrates an example matrix L of latent vector representations of items 101A-101E. As shown, matrix L includes N columns corresponding to the N items represented in matrix L. Each item 101A-101N is converted into a numerical representation referred to herein as a vector, for example using the item title and keywords from the item description, and that vector is included in the matrix L as one of the columns. In the illustrated example, the vector for the wheat cereal 101B is labeled as vector a, the vector for the chocolate puffs cereal 101C is labeled as vector b, and the vector for the coffee 101D is labeled as vector c.

FIG. 1B illustrates an example three-dimensional product feature space 105 with the three vectors a, b, c shown together within the product feature space 105. Each of the vectors a, b, c extends from the origin (0,0) a bounded amount into the volume of the product feature space 105. Together, the vectors a, b, c form three edges of a three-dimensional volume shown by parallelepiped 110. A parallelepiped is a three-dimensional geometric shape, each face of which is a parallelogram (e.g., a quadrilateral having two sets of opposing parallel sides). The volume of this parallelepiped 110 is the product of area of the base and altitude, defined by the scalar triple product $c \cdot (b \times a)$. Due to the formulation of the vector embeddings of the various items, greater volumes (or greater areas for co-planar vectors) represent a more diverse set of items, and smaller volumes (or smaller areas) represent a less diverse set of items.

Figure 1C:
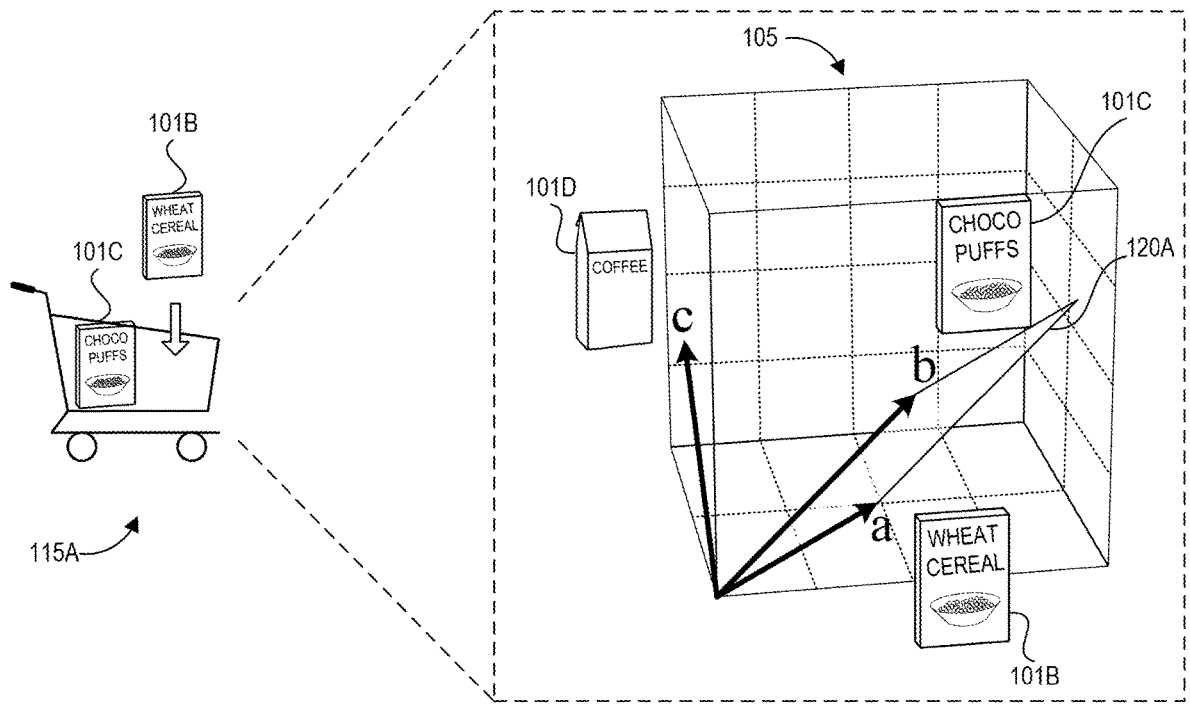
FIGS. 1C and 1D illustrate example volumes of vector space occupied by different item pairings.
Figure 1D:
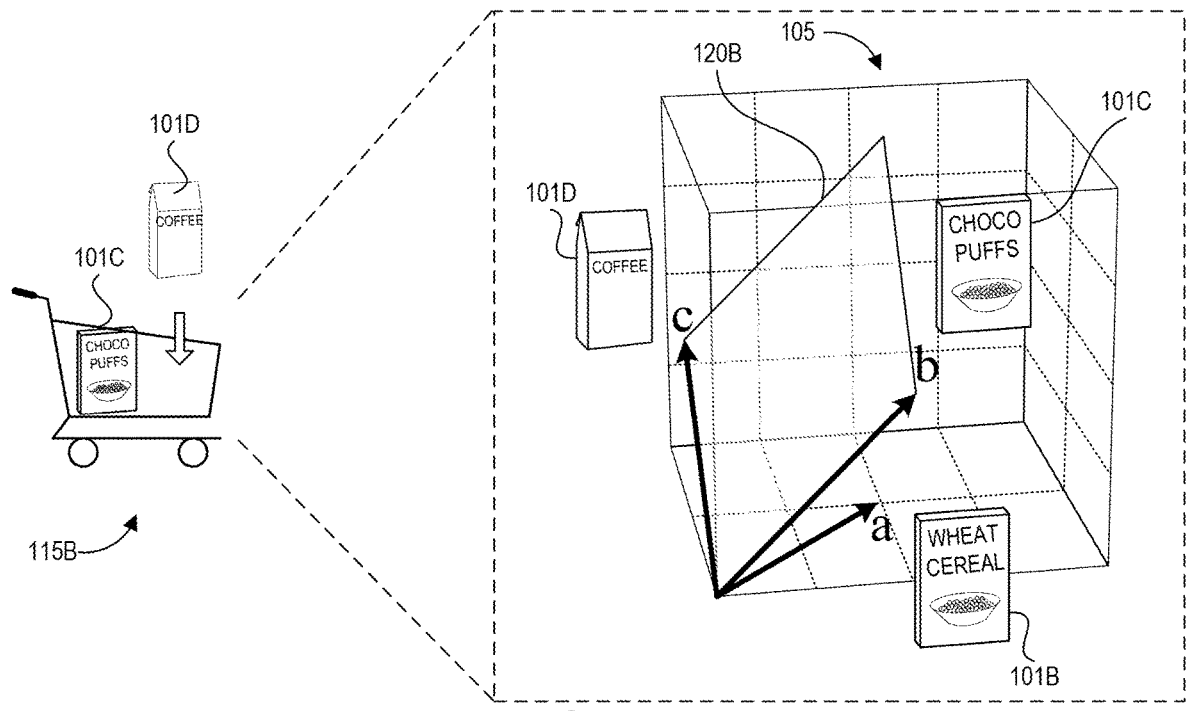

FIGS. 1C and 1D illustrate a graphical depiction of the evaluation performed by the diversity model according to the present disclosure using the item vectors and product feature space of FIGS. 1A and 1B. FIGS. 1C and 1D each begin with chocolate puffs 101C shown already added to a user's digital shopping cart 115A, 115B. Here, the digital shopping cart 115A, 115B represents a set of possible pantry recommendations that can be presented to (and potentially purchased by) a user.

In FIG. 1C, the wheat cereal 101B is added to the digital shopping cart 115A with the chocolate puffs 101C. The combination of the chocolate puffs 101C and the wheat cereal 101B occupies area 120A in the product feature space 105. In some embodiments, the diversity model may start with the chocolate puffs 101C because this item has the highest output score from the relevance model, and may move sequentially (or consider in parallel) the next most relevant items, wheat cereal 101B and coffee 101D.

In FIG. 1D, the coffee 101D is added to the digital shopping cart 115B with the chocolate puffs 101C. The combination of the chocolate puffs 101C and the coffee 101D occupies area 120B in the product feature space 105. The area 120B occupied by the combination of the chocolate puffs 101C and the coffee 101D is larger than the area 120A occupied by the combination of the chocolate puffs 101C and the wheat cereal 101B. Therefore, the diversity model would select the coffee 101D instead of the wheat cereal 101B to form a set of relevant and diverse items including the chocolate puffs 101C and the coffee 101D.

The simple example shown by FIGS. 1C and 1D seeks to form a set of two items from a pool of three items. This example uses a first selected item (the chocolate puffs 101C) and evaluates the incremental increase in the area that would be occupied by that first selected item in combination with each of the remaining two items in the pool (the coffee 101D and the wheat cereal 101B), ultimately selecting the item that yields the largest increase. It will be appreciated that this example can be extended to consideration of pools of greater size (e.g., hundreds of items), and that the calculations of volume occupied within the produce feature space can become more complex as the selected set of items grows (e.g., reaching recommendation set sizes of ten, twenty, thirty, or more items).

In some embodiments the recommendation engine can be trained offline and then used to provide recommendations online. As used herein, "offline" or "offline mode" refers to processing operations relating to data and/or calculations that are pre-computed, that is, performed in advance of an event that may trigger output of a recommendation. For example, a model as described herein may be trained periodically, such as once per day, and then used by a recommendation engine to generate recommendations for users as they interact with the electronic catalog. In some embodiments the model can be used offline to generate a user-specific list including items and associated probabilities of the user making a purchase of the item in an upcoming time interval. Such lists can be ranked based on the probability scores and subsequently provided to a diversity model as described herein in order to provide relevant and diverse recommendation sets to the user. Some recommendations can be provided outside of the context of user interactions with the electronic catalog, for example via targeted advertisements sent via electronic messages to users.

As used herein, "online" or "online mode" refers to processing operations performed in response to an event that triggers output of a recommendation. Online recommendations can be provided to users in "real time." For example, a recommendation provided in real time can be displayed to a user as the user is interacting with the electronic catalog, such as while the user logs in or is otherwise directed to a home page of the catalog. Other real time recommendations can be provided while the user is visiting any page of the electronic catalog that is used to display one or more recommended items to the user.

The present disclosure presents some examples in the context of personalized consumable or pantry item recommendations. In one example system, the pantry catalog service may waive a shipping fee for a box of purchased pantry items if the box includes at least 5 (or another number) qualifying items. The list of qualifying items may be dynamic, changing monthly for example, and include a small subset of the total pantry catalog inventory (e.g., around 2,500 items of around 19,000 items). Consequently, users discovering suitable qualifying items can present a problem. The disclosed machine learning system can address this problem by presenting personalized, relevant, and diverse recommendations of the qualifying items. As will be appreciated, the disclosed machine learning system architecture can be extended to recommending relevant-diverse sets of other pools of qualifying items, for example promotional digital media content, recommendations of users or user groups on a social media site, and the like.

It will be appreciated that, while many of the examples herein focus on the use of purchase history data for identifying relevant items, implementations of the disclosed machine learning system can use one (or a combination of) the following types of historical user behavioral data: purchase history, click history (e.g., items viewed), keywords entered in search queries, selection of browse nodes (e.g., catalog categories such as "clothing" or "garden"), text of item reviews submitted by the user, and other data representing interactions between users and items and/or the electronic catalog.

Further, the disclosed machine learning system can be used to generate recommendation sets of other types of items (e.g., non-consumable items, promotional items, digital media items). In the digital media context, the disclosed model can be used to generate playlists of music or videos, where the playlists are both relevant (e.g., in-line with the user's interests) and diverse (e.g., songs of different genres, videos relating to different topics). As well, the disclosed machine learning system can be used to generate recommendations outside of the context of an electronic catalog. For example, in the human resources context the disclosed model can be used to identify a team of qualified but diverse individuals to take on a project. In the educational context, the disclosed system can be used to identify a set of qualified and diverse candidates for school admissions. As such, in other contexts the relevance model can be trained to identify a variety of suitable outputs, and it is not limited to predicting items of interest to an electronic catalog user. Thus, the disclosed systems and methods can be used to select relevant but diverse subsets of recommendations in a variety of contexts.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Machine Learning System Architecture

Figure 2A:
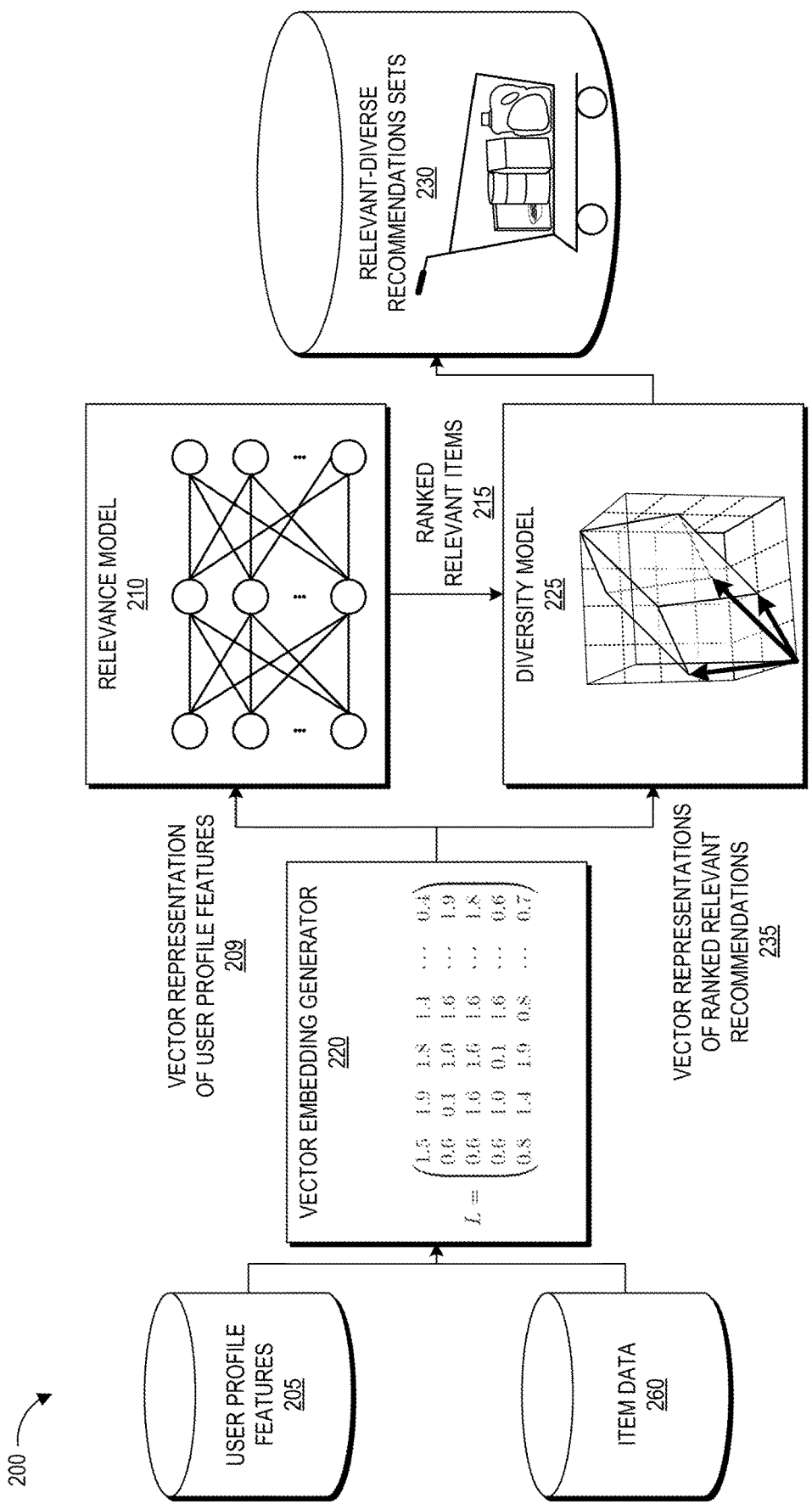
FIG. 2A illustrates a schematic block diagram of the disclosed machine learning system for balancing relevance and diversity of recommendations.

FIG. 2A illustrates a schematic block diagram of a recommendation engine 200 including the disclosed architecture for a relevance-diversity balancing machine learning system. The machine learning system can be implemented as one or more electronic digital memories and one or more electronic digital processors configured to generate recommendations as described herein. As illustrated, the recommendation engine 200 includes a user profile features data repository 205, item data repository 260, diversified relevant recommendations data repository 230, vector embedding generator 220, relevance model 210, diversity model 225, and diversified relevant recommendations data repository 230. One or both of the relevance model 210 and diversity model 225 can be a machine learning model, and the recommendation engine 200 can be considered as implementing a model ensemble to provide recommendations.

User profile features data repository 205 includes data storage device(s) storing historical behavioral data in association with specific user accounts. In the context of the electronic catalog, historical behavioral data can include item purchase histories, item rental histories, item detail page viewing histories, search query histories, browse node selection histories, item review histories, histories of items added to the cart (but not purchased) and/or added to lists such as wish lists, subscription and registry histories, and the like.

Item data repository 260 includes data storage device(s) storing data related to items, including the items being considered for recommendation. In the context of the electronic catalog, item data can include names, images, brands, prices, descriptions, user reviews (textual or numerical ratings), category/subcategory within a hierarchy of browsable categories of the electronic catalog, high-level category within a general ledger of the electronic catalog, particular services or subscriptions for which the item qualifies, and any metadata associated with specific items of the catalog.

The vector embedding generator 220 is an engine that takes user profile features or item data as inputs and converts these inputs into a high-dimensional vector representation of the input data. The vector embedding generator 220 can be a processor, or a group of processors, that executes machine-readable instructions detailing how to generate the vector representations from input data. Vector space models such as the vector representations described herein represent (embed) words in a continuous vector space where semantically similar words are mapped to nearby points, and thus can be considered as embedded nearby each other. The vector embedding generator 220 can embed words into vectors from text using the Continuous Bag-of-Words model (CBOW), the Skip-Gram model, or other suitable word-vector embedding models. One example of these models implements a neural network architecture having an output neuron for each word in the vocabulary of the vector embedding generator 220, where the vocabulary can be provided to the vector embedding generator 220 or learned from a corpus of training text. Such word-vector embedding models can be trained on a data set including a corpus of text drawn from one or both of the user profile features data repository 205 and item data repository 260 or on a different data set, and may account for term frequency. Further, a number of word-vector embedding models of the vector embedding generator 220 can be separately trained for generating different types of feature vectors, for example including a first word-vector embedding model trained to generate user history feature vectors for input into the relevance model 220 and a second word-vector embedding model trained to generate item feature vectors for input into the diversity model 230.

For example, words from an item's title and description can be represented as word vectors. In other examples, other keywords relating to item attributes can be used to generate vectors, with such attributes including the title and description as well as category, user reviews, and browse nodes of items in an electronic catalog, image features for image and video content, waveform features for audio and video content, lyrical features of music, and the like. In a 1-of-N (or "one-hot") encoding, a vocabulary of relevant words is defined, and then every element in the vector is associated with a word in the vocabulary. The encoding of a single word is a vector in which the corresponding element is set to one, and all other elements are zero. In a distributed encoding, the vocabulary of words is defined and then a distributed representation of a word is used to create the vectors. For example, each vector can include several hundred or thousand dimensions (elements). Each word in the vocabulary is represented by a distribution of weights across those elements. In this type of vectorization, instead of a one-to-one mapping between an element in the vector and the word, the representation of the word is spread across many or all of the elements in the vector. Similarly, each element in the vector contributes to the definition of many words. By examining a large corpus it is possible to learn word vectors that are able to capture, in an abstract way, the meaning of a word or group of words that relate to a particular item, as well as expressive relationships between words. Though discussed in the example context of natural language words, it will be appreciated that the vector conversion vocabulary can be structured to accommodate non-word features as well such as audio waveform features, image content features, and the like, as well as strings of multiple words.

The relevance model 210 is a machine learning model configured to provide relevance scores indicating how interesting a particular item is to a particular user. This model can be implemented as a processor, or a group of processors, that executes machine-readable instructions specifying the model structure (including parameters of a trained model), how to train the model, and/or how to use a trained model. The relevance model can be trained using behavioral data of a number of users, where the input features (e.g., user profile features) and output features (e.g., items purchased) are known. During training, the relevance model can learn the internal parameters that produce the best match (objectively or within allowable margins) between the input training data and the known expected output. Once trained, the relevance model can be provided with new input data and used to generate relevance scores for each of a number of items. In the context of the pantry catalog, the output of the relevance model can include a score for each item that qualifies for sale in the pantry catalog, and higher scores indicate higher likelihood of purchase by the user. In other context, higher relevance scores indicate higher likelihood of purchase, rental, streaming, clicking (e.g., user selecting an advertisement), and the like. The relevance model 210 is depicted with a high-level schematic representation of a neural network, however other machine learning models suitable for generating relevance scores can be used in other embodiments, for example random forests, decision trees, Bayesian probability estimators, and the like.

In one implementation of training the relevance model 210, user profile features can be converted to vector representation by the vector embedding generator 220 and provided as an input vector representation of user profile features 209 to the relevance model 210. A history of purchased (or otherwise interacted-with) items can be included in the vector representation of user profile features 209, and some or all of the history can be converted into an output vector by the vector embedding generator 220 and provided as output to the relevance model 210. The relevance model 210 can learn the parameters that produce the expected output given the expected input.

In use (e.g., using relevance model 210 for inference), the relevance model 210 receives vector representations of user profile features and outputs predicted relevance scores for a number of items (as specified, for example, by items mapped to output nodes of a neural network). A list 215 of at least some of these items, selected and ranked based on their relevance scores, can be output by the relevance model 210 (or a predetermined subset thereof) to the diversity model 225. For example, the top 100, 200, or 300 most relevant items (e.g., having the 100, 200, or 300 highest scores output from the relevance model 210) can be identified to the diversity model 225. The vector embedding generator 220 can then use data associated with these items in the item data repository 260 to generate high-dimensional vector representations of the identified items, and can provide the item vector representations 235 of the ranked relevant items as an input to the diversity model 225. This can involve using a trained machine learning model of the vector embedding generator 220 to generate the vector representations 235, or can involve accessing pre-generated vector representations previously generated by such a machine learning model.

The diversity model 225 receives the item vector representations 235 and uses a relevance-diversity optimization function to select a diverse subset of the identified relevant items. This model can be implemented as a processor, or group of processors, that executes machine-readable instructions specifying the model structure (including parameters of a trained model), how to train the model, and how to use a trained model. The diversity model 225 is illustrated with the latent product space of FIG. 1B, and can use the area/volume maximization determinations described above with respect to FIGS. 1C and 1D to build diverse subsets of the input relevant items. For example, an electronic catalog service having a pantry service can instruct the diversity model 225 to generate a set of 20, 30, or more items for recommendation to a user. Though illustrated with the latent product space of FIG. 1B, in other embodiments diversity model 225 can include other types of machine learning models or diversifying models. The diversity model can be the model described herein with reference to FIG. 1C, or in other implementations can be a determinantal point process (DPP), maximal marginal relevance reranking, multi-armed bandit learning algorithm, structural support vector machine, or other suitable model for generating a diverse subset of a pool of evaluated items.

The diversified relevant recommendations data repository 230 includes data storage device(s) storing the set of diverse, relevant recommendations generated by the diversity model 225. These recommendation sets can each be stored in association with a particular user in embodiments that input the behavioral data of that particular user into the relevance model 210. Other embodiments can input aggregate data from a pool of users (e.g., a specific demographic of users) into the relevance model 210, and can store the recommendation sets in association with each user in the pool or with an indication of the pool usable to present the recommendation set to users in the pool.

Though not illustrated, the recommendation engine 200 can further include a user interface generation module. The user interface generation module can identify a trigger indicating that recommendations should be presented to a particular user, retrieve the diversified relevant recommendations stored in association with the particular user in the data repository 230, and generate/output a user interface that presents the user with the recommendations. One example of such a user interface is discussed with respect to FIG. 4.

In other contexts, the types of historical user behaviors or other user-related information recorded in the user profile features data repository 205 can vary according to the type of system, for example storing media play history in the context of a digital music and/or movie streaming/purchase service, resume information in the context of a human resources system, and application information in the context of an academic admissions system. Similarly, the types of data in item data can vary according to the type of system using the recommendation engine 200, for example storing title, author, album, musical characteristics, waveform analysis, and the like for digital music files in a digital music service; and storing title, author, image content data, audio content data, and metadata for digital movie files.

Figure 2B:
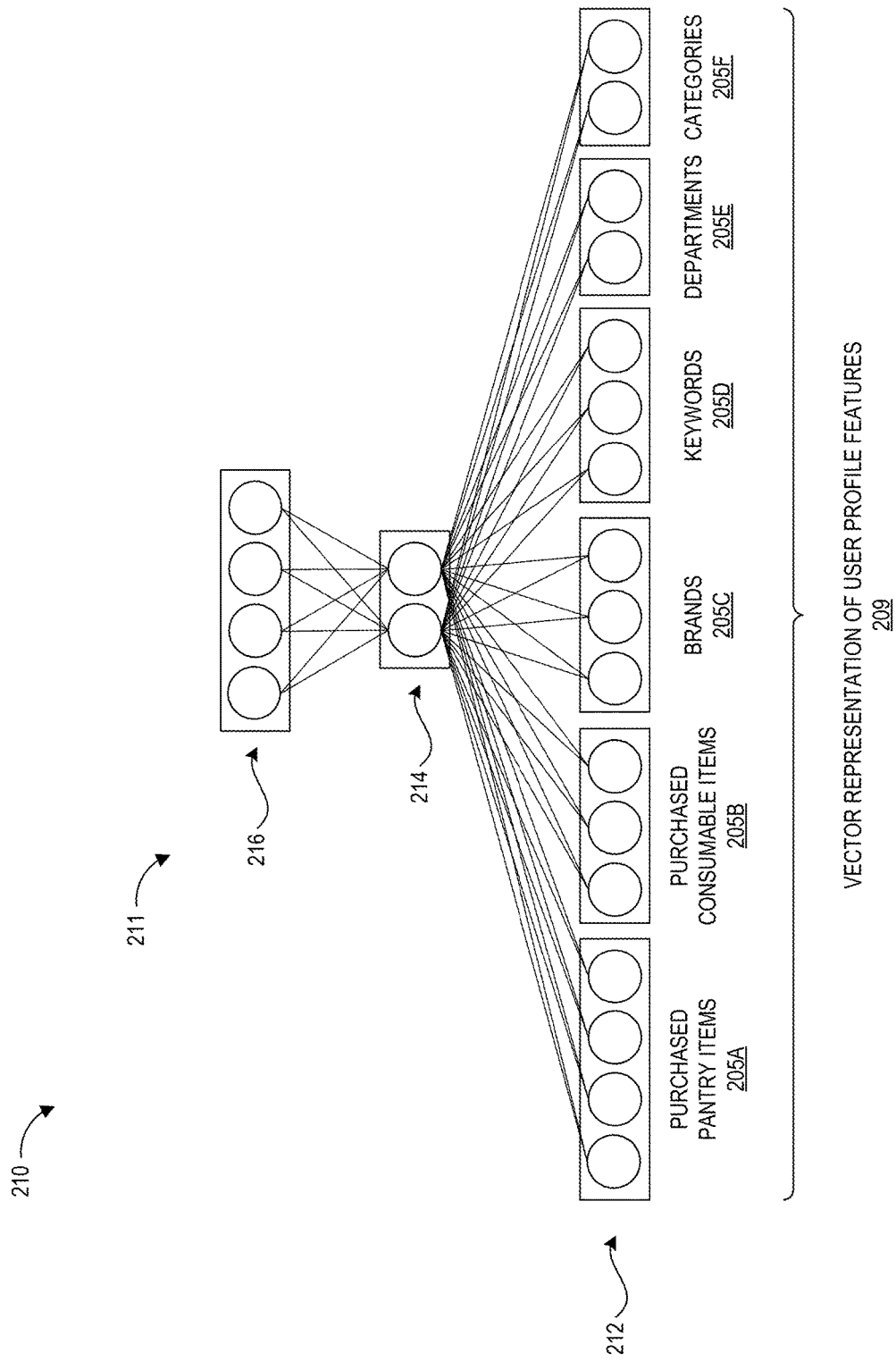
FIG. 2B illustrates an example neural network usable as the relevance model of FIG. 2A.

FIG. 2B illustrates an example neural network 211 usable as the relevance model 210 of FIG. 2A. The neural network includes an input layer 212, a hidden layer 214, and an output layer 216 each including a number of nodes (represented by circles in FIG. 2B) connected by connections (represented by the lines between circles).

In one implementation, neural network 211 is a feedforward neural network. Some implementations of neural network 211 can include deep neural networks ("DNNs") and recurrent neural networks ("RNNs"). Such neural networks typically have multiple layers of nodes. Neural network 210 includes input layer 212, and output layer 216, and any number of intermediate, internal, or "hidden" layers 214 between the input 212 and output 216 layers. The individual layers may include any number of separate nodes. Each node can be considered as a computer-implemented simulation of a neuron and represents a connection between the output of one node to the input of another. Thus, a node may be thought of as a computational unit that computes an output value as a function of a plurality of different input values.

The input layer 212 has input nodes which send data via connections to the hidden layer 214 of nodes, and then via more connections to the output layer 216 of output nodes. Some systems can have more layers of nodes, some having increased layers of input nodes and output nodes. Each hidden layer can transform the input data and output the transformed data for use by a subsequent layer. Activation functions and patterns in hidden layer 214 can be considered as an encoding of how the network is programmed to identify significant features of the inputs. In one example, the hidden layer 214 can include 1,024 rectified linear unit ("RELU") activations implementing the rectifier activation function (also known as the ramp function). In one embodiment, each node in the output layer 216 can be mapped to an item that qualifies for the pantry catalog. In other embodiments, the nodes in the output layer 216 can be mapped to the set of items considered for recommendation by recommendation engine 200.

Each node can be logically connected with many others by synapses/connections, for example with some or all nodes in adjacent layers. Such connections can be enforcing or inhibitory in their effect on the activation state of connected nodes. Each individual node may have a summation function which combines the values of all its inputs together, a threshold function, and/or limiting function on each connection and on the node itself such that it must surpass it before it can propagate to other neurons.

Nodes may be considered to be "connected" when the input values to the function associated with a current node include the output of functions associated with nodes in a previous layer, multiplied by weights associated with the individual "connections" between the current node and the nodes in the previous layer. The connections may store parameters called weights that can manipulate the data in the calculations. The strengths of node connections are typically learnt from data during the training process.

The parameters of the neural network 211 (e.g., the strengths of node connections) can be set in a process referred to as training. For example, neural network can be trained using training data that includes input data and the correct or preferred output of the model for the corresponding input data. Events and associated data in historical user behavioral data can be converted into vector representations by the vector embedding generator 220, with user profile feature vectors provided to the nodes input layer 212 and corresponding user item interactions (e.g., purchases, rentals, streams, etc.) provided to the nodes of the output layer 216. For example, if a user has purchased an item, the corresponding node in the output layer can be set to "1" while nodes corresponding to unpurchased items can be set to "0." The user's entire behavioral data or a window including a subset of the data can be used for the training and/or inference stages. Further, the expected output can be identified from a smaller window of the behavioral data, for example a most recent week, two weeks, month, or year, while the input can be identified from the remaining window of the behavioral data (e.g., from a week prior to a year prior, from a month prior back to the beginning of the history, etc.).

In recommendation systems, such as implementations of recommendation engine 200 designed to recommend items (e.g., goods and/or services) to users based on the purchase or acquisition histories of the users, the output layer 216 of a trained form of the neural network 211 generates probability scores indicating the probabilities of a user purchasing or otherwise acquiring items during a time period.

Sets of individual input vectors ("mini-batches") may be processed at the same time by using an input matrix instead of a single input vector, which may speed up training. The neural network 211 can repeatedly process the input data, and the parameters (e.g., the weight matrices) of the neural network 211 can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

When neural network 211 is used to process input data in the form of a matrix of input vectors (e.g., a batch of training data input vectors or inference input vectors), the neural network may perform a "forward pass" to generate a matrix of output vectors. The input vectors may each include n separate data elements or "dimensions," corresponding to the n nodes of the neural network input layer (where n is some positive integer). Each data element may be a value, such as a floating point number or integer. The forward pass includes multiplying the matrix of input vectors by a matrix representing the weights associated with connections between the nodes of the input layer and nodes of the next layer, and applying an activation function to the results. The process is then repeated for each subsequent neural network layer.

The neural network 211 can have thousands of nodes, and thousands of weights for connections between the nodes of all of the adjacent layers. As such, the neural network 211 may consume a large amount of space when stored, a large amount of bandwidth when transmitted, a large amount of memory when trained, and a large amount of processing resources when used for inference due to the large number of calculations to be performed. In some cases, neural network 211 may be so large that it cannot practically be implemented with a single processor (e.g., it may require more memory than is available to a single processor). The neural network would then typically be split up and distributed among multiple processors.

The illustrated neural network 211 includes an input vector 209 of user profile features tailored to the context of the pantry catalog. In this implementation, there can be around 63,000 different input features including purchase pantry items 205A, purchased consumable items 205B, brands 205C of these items, keywords 205D of these items, departments 205E of these items, and categories 205F of these items. Accordingly, the input layer 212 can include around 19,000 input nodes corresponding to pantry catalog items potentially purchased by a user, around 7,500 input nodes corresponding to consumable items from other areas of the electronic catalog outside the pantry catalog that could have been purchased by the user, around 23,000 input nodes corresponding to brands of past purchases, around 11,000 input nodes corresponding to item-type keywords related to the pantry and consumable items, around 1,400 input nodes corresponding to departments of products previously bought by the user, and around 96 general ledger categories relating to the pantry and consumable products. The values of these nodes can be set based on their particular occurrence within the purchase history of the user. It will be appreciated that these numbers are representative of one example and can be varied in modifications on the neural network architecture, for example based on the inventory and hierarchical structure of a specific electronic catalog.

In the illustrated example, during the inference stage a feature vector representing the values of these input nodes corresponding to the events identified in a particular user's historical behavioral data are fed through the dense input layer 212 including, for example, 1,024 outputs and then passed through the RELU activation units in order to generate a hidden layer representation of the feature vector. The hidden layer activations can be fed through another dense layer 216 including, for example, around 19,000 outputs (one output for each item in the pantry catalog) and then passed through sigmoid units to produce purchase probabilities (e.g., relevance scores) for each pantry item. This relevant recommendation generation process can be performed for some or all users of the pantry catalog, as well as of the larger electronic catalog, periodically (for example, once per day, once per week, or once per month. This can include hundreds, thousands, or millions of users in various embodiments of the electronic catalog.

In one implementation, each training instance can correspond to a pantry catalog order at a particular time t. The target vector, $y^{(t)}$, is a binary vector describing which pantry catalog items the user bought. The feature vector, $x^{(t)}$, encodes the user's prior shopping history up through the preceding day. The relevance model 210 is trained on orders data by maximizing the log likelihood of the items in the basket:

$$L(\hat{y}, y^{(t)}) = \Sigma_j y_j^{(t)} \log(\hat{y}_j) + (1 - y_j^{(t)}) \log(1 - \hat{y}_j) \qquad (1).$$

where $\hat{y}$ is the vector of predicted purchase probabilities.

The illustrated embodiment of the neural network 211 uses around 63,000 features of shopping history in $x^{(t)}$, including purchase pantry items 205A, purchased consumable items 205B, brands 205C of purchased items, keywords 205D of purchased items, departments 205E of purchased items, and categories 205F of purchased items. These features were chosen for their ability to shed light on the preferences, needs, and tastes of pantry catalog users with regard to consumables shopping. Previously purchased pantry catalog items and consumable items provide direct signals about what a user will likely purchase from the pantry catalog in the future. The brands of items previously purchased, either within the pantry catalog or the larger electronic catalog, provide information about a user's tastes and style. Item-type keywords and general ledger categories of items purchased, either within the pantry catalog or the larger electronic catalog, provide information about the kinds of things the user likes or needs. The departments of previously purchased items (e.g., "men's," "women's," or "children's") also indicate what the needs of a household using a particular account may be. In offline experiments on logged pantry catalog data, each of the feature types in addition to the previously purchased pantry items modestly improved the relevance model's performance on held out data over and above using just previously purchased pantry items.

By mining features of user purchases from across the larger electronic catalog, the neural network 211 can address the pantry catalog cold-start user problem and recommend pantry items to catalog users who have never shopped on the pantry catalog before. This is because even first time pantry catalog shoppers are likely to share overlapping signals with existing pantry catalog users. Though disclosed in the context of pantry, it will be appreciated that the selection of features from the wider catalog can address the cold start problem for other sub-regions of the larger electronic catalog, such as a grocery service, wedding registry service, or other specific sections of the catalog. For example, the features can include items purchased from a particular sub-section of the catalog, similar types of items purchased from another sub-section or the larger catalog, and purchase features from purchases across the larger catalog.

However, by mining signals from catalog-wide shopping history, it is easy to end up with millions of features in the neural network 211. Since one implementation of the neural network 211 uses a hidden layer 214 that is 1,024 units wide, the space per feature is not insignificant. The disclosed implementation therefore only includes features in the input data 205 that appear in the purchase histories of at least 1,000 different pantry catalog users. As will be appreciated, this number can vary based on the overall size of the training set and the desired level of significance of recurring features. Thus, the size of the input vectors can be reduced, and all features selected can have significant support in the training data.

In addition to the items, brands and types of products a user buys, it can be beneficial to represent the number of times a feature is observed in a user's behavioral data history, as well as the amount of time since it was last observed. An implementation of the neural network 211 uses the following formula to encode this information. The value of the i'th feature is computed as:

$$x[i] = \left(1 - \frac{daysSinceLastPurchase(i)}{MaxDaysOfPurchaseHistory}\right) \quad (2)$$
$$\log(1 + numPreviousPurchases(i))$$

where MaxDaysOfPurchaseHistory is the total number of days in the training set. Thus, the value of a feature increases logarithmically with the number of times it is observed and decays linearly with the number of days since it was observed. Thus, each value in an input feature vector can be weighted based on recency and frequency of the corresponding event in the user purchase history.

Figure 2C:
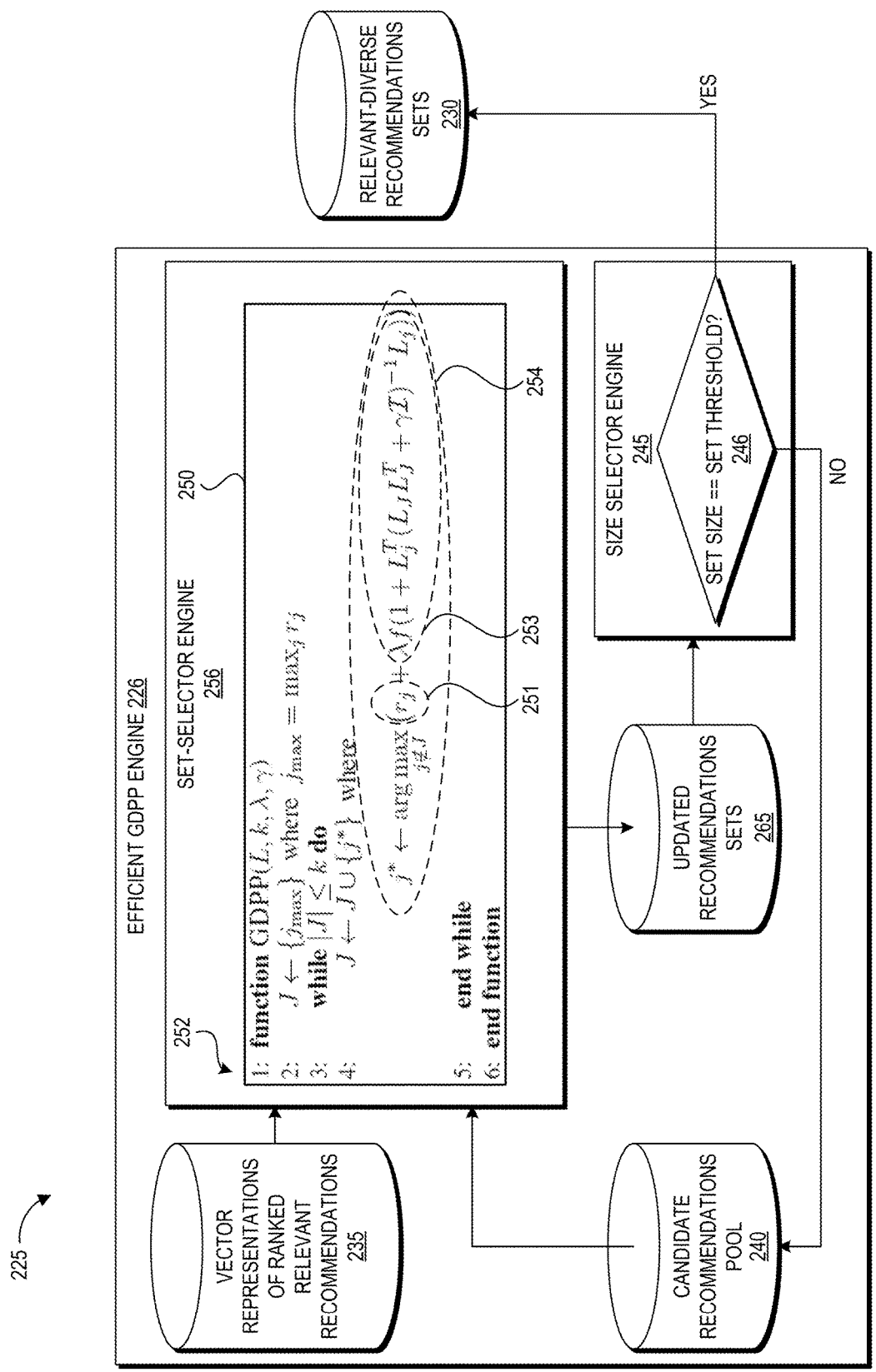
FIG. 2C illustrates an efficient GDPP implementation usable as the diversity model of FIG. 2A.

FIG. 2C illustrates an efficient greedy determinant point process (GDPP) engine 226 usable as the diversity model 225 of FIG. 2A. The efficient GDDP engine 226 includes a candidate recommendations pool data repository 240 that stores data representing the total candidate pool of items and items remaining in the candidate pool for consideration for addition to the recommendations set. This data is passed to a set-selector engine 256 together with vector representations from the vector representations of ranked relevant recommendations data repository 235. The efficient GDDP engine 226 also includes an updated recommendation sets data repository 265 that stores the items currently in the recommendations set, and a size selector engine 245.

Before discussing the architecture of the efficient GDPP engine 266, consider the following related (but likely more computationally expensive) alternatives to the embodiment of the efficient GDPP engine 226.

Generally, a diversity model 225 according to the present disclosure re-ranks recommendations from the neural network 211 (or another relevance model 210) to generate a set of both relevant and diverse recommendations. In embodiments of the present disclosure, the diversity model 225 operates on vector embeddings of the recommendations. The vector embedding of recommendation k can be represented as $x_k$, and can be a one-dimensional or high-dimensional vector. Thus, a matrix representing the pool of recommendations, X, is formed from the set of recommendation feature vectors such that $X=(x_1; \ldots; x_k)$ for the set of recommendations 1 through k.

The diversity model 225 picks a diverse set of items based on maximizing the set-selection objective score of the set. The set-selection objective score, variations of which are described in more detail below, is computed by a set-selection engine that factors in the relevance scores of the recommendations in the set as well as a diversity score representing the total diversity of the set. The diversity score can be equated to the determinant of a similarity matrix $X^TX$ representing the similarity of the recommendation set, as described in more detail below, with T representing a subset of indexing rows or columns. As described above with respect to FIG. 1B, this diversity score can be equal to the volume squared of the parallelepiped spanned by the recommendation feature vectors. Maximizing this volume equates to maximizing the determinant of the similarity matrix—given by $\det(X^TX)$—since the determinant equals the squared volume of the selected recommendation feature vectors. The maximized volume is occupied by the most diverse set. Hence, adding a determinant-maximizing term to the set-selection criterion promotes diversity. However, disclosed embodiments also factor in relevance scores to determine the set-selection objective score.

It should be noted that the volume of a parallelepiped is equal to the determinant of the corresponding matrix of the vectors that form the edges of the parallelepiped, as described with respect to FIG. 1B. For example, the area occupied by two vectors is a parallelogram, the volume occupied by three vectors is a parallelepiped, and the volume occupied by four or more vectors is an n-dimensional parallelotope defined by n edge vectors. Further, because the product feature space is mathematical and not physical, it is not limited to being three-dimensional. Thus, the diversity model can evaluate the volume occupied by an n-dimensional parallelotope embedded inside an m-dimensional feature space.

One embodiment of the diversity model 225 can optimize a set-selection objective including terms relating to both item relevance scores (e.g., probabilities provided by the relevance model 210) and item diversity scores (e.g., determined based on volume occupied in feature space). Returning to the example context of the electronic catalog for pantry items, let M be the number of items in the pantry catalog. Let N be the number of users of the pantry catalog. Let $r_i$ be the relevance score of item i, for example predicted by the neural network 211. Let J denote a subset of indices corresponding to a subset of items. Let the identity matrix be denoted by I. Let L denote a matrix of latent vector representations for items (e.g., FIG. 1A), where the i'th column of L, $L_i$, represents the vector representation of item i. Also, if T is a subset of indices (indexing rows or columns), let $L_T$ denote the sub-matrix of L whose columns are restricted to the indices in T (i.e. $L_T$ only has |T| columns). Similarly, let $L_{TT}$ denote the sub-matrix of L whose rows and columns are restricted to the indices in T. Finally, let S denote the similarity matrix of the items, obtained as $S=L^TL$. Thus, $S_{ij}=\langle L_i, L_j\rangle$, the inner product between $L_i$ and $L_j$.

When selecting k items to recommend, this embodiment can search for the set J that maximizes:

$$\max_{J:|J|=k} \sum_{i \in J} r_i + \lambda(\log\det(S_{JJ} + \gamma I)) \quad (3)$$

The objective of equation (3) can be thought of as a relevance-diversity, subset selection problem given an initial set of recommendations for each user. The first term in the objective ($r_i$) quantifies the relevance score of the recommendations and promotes the selection of highly relevant set of items. The values for the first term can be the relevance scores output from the neural network 211 in some implementations. The second term in the objective (log $\det(S_JJ+\gamma I)$) promotes diverse sets to be chosen, with $_7$ being a pre-specified constant that keeps the objective well defined. This is similar to the objective used by determinantal point processes (DPPs) and γ is also related to maximizing the Gaussian entropy.

The parameter λ is a trade-off parameter that trades-off relevant recommendations with diverse recommendations. The higher λ is, the more the objective prioritizes diversifying the recommendations and the objective prioritizes relevance. The opposite is true for smaller values of λ. The particular value of λ chosen for a given implementation of objective of equation (3) can vary depending upon the desired balance between relevance and diversity, however it can be preferable to make the diversity scores on the same or a similar scale as the relevance terms, and thus the value of λ can depend upon the values of the relevance scores. In one example, in various embodiments 0.1 and 0.01 are suitable values for λ.

It is noted that DPPs have been proposed as a way to select a diverse subset of items given features vectors, or equivalently, a similarity kernel for items. DPPs are probabilistic models of global, negative correlations and are a distribution over subsets of a fixed ground set. For example, a DPP over a ground set of N items can be seen as modeling a binary characteristic vector of length N. A characteristic of a DPP is that these binary variables are negatively correlated in that the inclusion of one item makes the inclusion of other items less likely. The strengths of these correlations can be derived from a kernel matrix that defines a global measure of similarity between pairs of items so that more similar items are less likely to co-occur. As a result, DPPs assign higher probability to sets of items that are diverse.

Thus, DPPs are essentially a probabilistic method to select subsets of a ground set that are the most diverse. The method assigns probability to subsets of a ground set so that the probability is expressed as the determinant of the DPP's kernel's similarity matrix. For example, let S be a similarity matrix and J be a subset of the ground set. Then under a DPP framework, the probability of sampling a set X which contains J is expressed as the following power set approximating the similarity matrix determinant: $P(X \supseteq J) \propto \det(S_{JJ})$. Thus, the more diverse the set J, the higher the volume of the parallelepiped of the represented items and the higher the probability of its being included in the sample, X.

Although DPPs are able to assign probability to subsets of all sizes, in practice, the recommendation engine 200 only needs to select subsets of a fixed size, k. For example, the predetermined number of items per set can be twenty, thirty, or more recommendations (or any desired number of two or more recommendations). In this case, a DPP can be specialized to a k-DPP, a conditional DPP that models only sets of cardinality k. In the case of the k-DPP, $P(X \supseteq J) \propto \det(S_{JJ})$ if |J|=k and is 0 otherwise. k-DPPs are thus a variant of DPPs where the probability mass is non-zero only for sets of size equal to k. Accordingly, the relevance-diversity objective of equation (3) can be performed for J:|J|=k (e.g., where the subset of item indices J is equal to k) similar to a k-DPP.

Although the relevance-diversity objective of equation (3) is based on the same concepts as DPPs, the diversity model 225 does not sample from a DPP. Rather, the diversity model 225 maximizes the regularized objective in equation (3) based on relevance scores and diversity scores, which corresponds to finding the mode of the DPP induced by the similarity kernel.

It should be noted in equation (3) that S is a similarity matrix of dimension M×M and $S_{JJ}$ is of dimension k×k. This re-sizing property makes the formulation of equation (3) algorithmically inefficient. Accordingly, another embodiment of the diversity model 225 according to the present disclosure reformulates objective (3) as follows:

$$\max_{J:|J|=k} \left( \sum_{j \in J} r_j + \lambda \log \det \left( \sum_{j \in J} L_j L_j^T + \gamma I \right) \right) \quad (4)$$

Instead of $S=L^T L$, the reformulated objective of equation (4) has a matrix structure of the form $LL^T$. Optimizing the reformulated objective of equation (4) can approximate or be the same as optimizing the DPP objective of equation (3).

Another embodiment of the diversity model 225 can implement a greedy determinantal point process (GDPP) in order to approximately solve for equation (4). A greedy algorithm is an algorithmic paradigm that involves making locally optimal choices (e.g., what item adds the most incremental value to the current set) with the hope of leading to a globally-optimal solution. Thus, the set is built item by item, with each set expansion optimized without reconsideration during subsequent set expansions. This is in contrast to the more computationally expensive approaches of equations (3) and (4) that compute the possible objective score of all possible subsets within the pool, or all possible subsets of a particular size within the pool, and then choose the final recommendation set based on the maximum computed objective score.

The GDPP can greedily solve for equation (4) using the algorithm represented by the example block of code shown below:

```
1: function GDPP(L, k, λ, γ)
2:     J ← {j_max} where j_max = max_j r_j
3:     while |J| ≤ k do
4:         J ← J ∪ {j*} where
               j* ← argmax_{j∉J} (r_j + λ log det(L_J L_J^T + L_j L_j^T + γI))
5:     end while
6: end function
```

The algorithm greedily adds an index (the row or column of the matrix L of latent vector representations that corresponds to an identified item) to a running index set (the current recommendation set) in each iteration. The index is added that maximizes the regularized objective in equation (4). This GDPP enjoys a (1−1/e) approximation guarantee with respect to the objective in equation (4). This greedy procedure can be viewed as seeking the mode of the DPP. While this combinatorial problem is hard to solve, the GDPP is applicable since the objective in (4) is submodular and monotone.

The main update equation in the GDPP (block 4, solving for j*) is the same as equation (4). Rather than summing objective scores across all possible sets of cardinality k, the update equation is performed at each stage to consider the existing recommendation set together with each of the remaining items in the candidate pool to identify the next item to add to the set. However, it will be noted that this main update equation involves computing the determinant of a matrix, which is inefficient and not scalable, particularly when the size of the latent feature matrices are considered. For example, determinant calculation requires a square matrix. Thus, in the present disclosure the determinant is taken of a similarity matrix that squares the latent feature matrix (or certain indices of this matrix). In some embodiments, the latent feature matrix can represent hundreds or thousands of different items, each represented by a high-dimensional vector having thousands of features.

Accordingly, another embodiment of the diversity model 225 can reformulate the GDPP as illustrated in FIG. 2C in order to bypass several processing steps of the regularized relevance objective that may otherwise render the diversity model very computationally expensive.

Returning to FIG. 2C, depicted is an efficient, reformulated GDPP 226 usable as the diversity model 225. Vector representations of ranked relevant recommendations 235 are input into the efficient GDPP engine 226 and diversified relevant recommendations 230 are output.

The efficient GDPP engine 266 draws from a candidate pool of identified relevant recommendations, from which the relevant-diverse subset is created. This candidate pool is stored in the candidate recommendations pool data repository 240. Initially, the candidate pool can include a top number of recommendations ranked by relevance scores determined by a relevance model, for example a top two hundred most relevant items. This pool can be decremented at each stage of the set-building process to remove the item just added to the set, such that the candidate recommendations pool data repository 240 keeps a running index of the items currently in the candidate pool.

The set-selection engine 256 iteratively chooses the best recommendation, from among the remaining recommendations in the candidate pool, to add to the set. The set-selection engine 256 accesses both vector representations and relevance scores of the items in the candidate pool and items currently in the recommendation set. Initially, the selection function can identify the recommendation with the highest relevance score. For example, with a single item in the set, the relevance term of objective equations (3) and (4) equals that item's relevance score, and the diversity term is calculated using a single vector that does not occupy any volume in the latent product space. Maximizing this initial stage involves finding the item with the highest relevance score. At the next stage, the selection function can iteratively consider pairs—including the first item added to the set and then each of the recommendations remaining in the candidate pool—in light of the objective. The item that maximizes the objective with the first item is then added to the set. At each stage, the relevance term is computed by summing the relevance scores of all the items in the set. The diversity term is computed seeking the maximum volume formed in latent product space by the feature vectors representing the items. The relevance and diversity terms are added together to generate the score for that item set, and the As illustrated, the set-selection engine 256 seeks to greedily and approximately solve for the set with the maximum objective score with the series of algorithmic steps 252 in the depicted block of code 250. It will be appreciated that variations on the specific depicted code that achieve the same function as the described set-selection engine 256 are also within the scope of the present disclosure.

As described above, the reformulated DPP objective includes a (1) first term (the relevance term) that sums the relevance scores of items in a set and a (2) second term (the diversity term) that evaluates diversity of the set as a function of a trade-off parameter set to achieve a desired balance between relevance and diversity, a diversity score computed as the log determinant of the similarity matrix of the items (the square of the volume in latent vector space of the items in the set (e.g., the disclosed metric used to evaluate the diversity of these items), and a smoothing parameter that introduces Gaussian entropy. Due to the computational costs of the computing the diversity score, as well as the cost of the update equation of the CI-DPP described above, the set-selector engine 256 instead uses update equation 254 copied as equation (5) below, with f being a concave increasing function:

$$j^* \leftarrow \underset{j \notin J}{\operatorname{argmax}}\left(r_j + \lambda f\left(1 + L_j^T (L_J L_J^T + \gamma \mathcal{I})^{-1} L_j\right)\right) \quad (5)$$

This update equation 254 is used to determine, at each stage, which new item to add from the candidate pool into the recommendation set. The usage of the reformulated update equation 254 avoids determinant computations, thus rendering the set-selection engine 256 computationally efficient while still yielding acceptable diversity in the results. For example, the inverse in equation (5) can be cached and updated efficiently using the Sherman-Morrison-Woodbury formula for rank-1 updates. Further, the update equation (5) can actually be used to construct an exact or substantially exact (e.g., produces the same or substantially same updates as the GDPP described above) and more efficient implementation of the GDPP algorithm that avoids determinant computations and resorts to efficient matrix updates. The example code 250 shown by the set-selection engine 256 provides recommendation sets having volumes in latent vector space of at around two-thirds (1-1/e, or 62.3%) of the "optimal" or maximum volume over any set generated by the objective of equation (3), while at the same time reducing computational complexity from an exponential scale down to a polynomial scale. This two-thirds approximation has been validated by experimental results.

At each iteration of the update equation 254, another item from the candidate pool is identified by the set-selector engine 256 and added to the previous recommendation set to form an updated recommendation set. The running index of items in the updated recommendation set is stored (possibly temporarily, as in a working memory) in the updated recommendation set data repository 265. The size of this updated set is sent to the size selector engine 245, which performs a comparison using the comparison module 246 to determine whether the set size equals the predetermined number of items per set (e.g., the items per set threshold value). If not, the running index of items in the candidate pool is decremented by the item just added to the set, and the set-selector engine 256 uses the update equation 254 to again expand the set size by one item from the remaining candidate pool. This one item is the item that maximizes the reformulated update equation 254. This continues until the set size equals the desired threshold, at which point the complete diversified relevant recommendation set is provided to the relevant-diverse recommendation set data repository 230. This can be performed periodically for a number of users, for example once per day, week, or month for hundreds, thousands, or millions of users.

In summary, the relevance-diversity subset selection model of equation (3) can be used to seek the optimal subset (e.g., the subset occupying the largest volume in three-dimensional product space of all possible subsets) of relevant and diverse items from among a larger pool of identified relevant items. However, practically speaking the implementation of equation (3) is not computationally feasible, even when leveraging the collective capabilities of a large number of processors. This problem is addressed by several aspects of the present disclosure. First, reformulating the diversity objective of equation (3) as shown in equation (4) avoids the algorithmic inefficiencies resulting from the re-sizing property of the similarity matrix S. However, the reformulated objective of equation (4) can be more efficiently approximated using a GDPP as described above. However, update equation of the GDPP still requires computing the determinant of a matrix, which is neither efficient nor scalable. Accordingly, the use of the reformulated GDPP using update equation (5) provides diversified recommendations while achieving a level of computational efficiency that makes it practical for regular use in a recommendation engine 200.

Overview of Example Machine Learning Training and Inference Methods

Figure 3A:
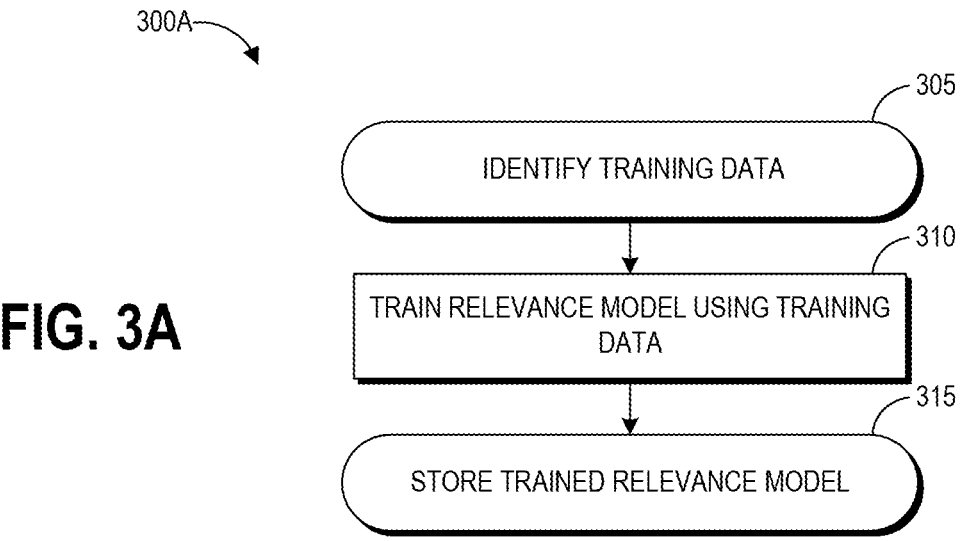
FIG. 3A depicts a flowchart of an example method for training a relevance model according to the present disclosure.

FIG. 3A depicts a flowchart of an example method 300A for training a relevance model 210 according to the present disclosure. The method 300A can be implemented by a machine learning engine as described herein.

At block 305, the machine learning engine can identify training data. This can involve conversion of identified training data into high dimensional vector representations as described herein. As described above, in the context of a pantry catalog service, input training data can include user profile features that leverage a wide range of signals from historical pantry catalog user behavioral data for a number of different users (e.g., >1000 in some examples). The input data can include vector representations of purchased pantry items, purchased consumable items, brands of these (or all) purchased items, keywords of these (or all) purchased items, departments of these (or all) purchased items, and categories of these (or all) purchased items. The output data can include vectors indicating which of the pantry items have been purchased by the users. Each training data set can include an input user profile feature vector and a corresponding output purchase history vector of a single user, and multiple such training data sets can be used to train the relevance model 210. The input and output features can be modified by a function such that the value of a feature increases logarithmically with the number of times it is observed and decays linearly with the number of days since it was observed.

At block 310 the machine learning engine trains the relevance model 210 using the identified training data. During training the parameters of the relevance model 210 can be tuned to predict the expected outputs from the given inputs. For example, a neural network 211 can be trained via back propagation until the weights of node connections enable the neural network 211 to predict the purchase history vectors from the input user feature vectors.

At block 315, the machine learning engine stores the trained relevance model 210 for use in generating relevance scores (e.g., representations of purchase likelihood for pantry items). For example, the machine learning engine can provide the trained relevance model to the recommendation engine 200.

Figure 3B:
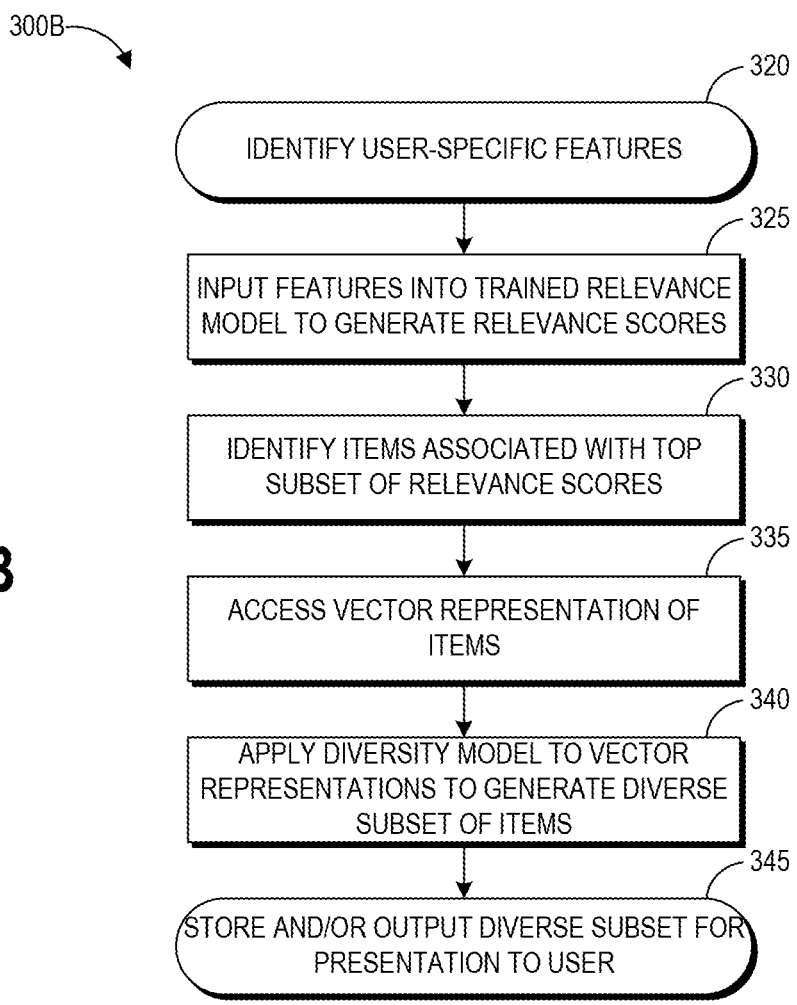
FIG. 3B depicts a flowchart of an example method for using a trained relevance model and a diversity model to generate recommendations according to the present disclosure.

FIG. 3B depicts a flowchart of an example method 300B for using a trained relevance model and a diversity model to generate recommendations according to the present disclosure. The method 300B can be implemented by a recommendation engine as described herein.

At block 320, the recommendation engine can identify user-specific features that correspond to the input features identified for the training data at block 305. For example, the recommendation engine can mine historical behavioral data associated with a particular user to identify pantry items purchased by the user, consumable items purchased by the user, brands of these (or all) purchased items, keywords of these (or all) purchased items, departments of these (or all) purchased items, and categories of these (or all) purchased items. These input features can be modified by a function such that the value of a feature increases logarithmically with the number of times it is observed and decays linearly with the number of days since it was observed.

At block 325, the recommendation engine can input the features into the trained relevance model 210 to generate relevance scores. For example, the vector representation of the user features can be provided to the input layer of a feedforward neural network, which can perform a forward pass of the data through one or more hidden layers, and can apply sigmoid functions at the output layer to generate relevance scores indicating, for each of a number of items (e.g., in a pantry catalog), the probability that the user will purchase the item.

At block 330, the recommendation engine can identify items associated with a top subset of the relevance scores. This can include the top number (e.g., 200 or 300) items, the top percentage (e.g., 10%, 50%, etc.), or a variable number of items having relevance scores above a threshold relevance value. Using a subset of the most relevant items for diversity evaluation can reduce the computational demands of the disclosed diversification.

At block 335, the recommendation engine can access vector representations of the identified subset of the relevant items. For example, words in the item title and description, or words relating to other types of item attributes, can be converted into 1-of-N encoding or distributed encoding word vectors using a machine learning model trained to generate such vector representations based on keywords. As such, the vector representations of the items can be mapped to an m-dimensional product feature space for diversity evaluation. In some embodiments, the generation of these vector representations may be pre-computed and stored in association with respective items such that pre-generated vector representations are accessed during the process 300, for example from item data repository 260.

At block 340, the recommendation engine can apply a diversity model 225 to the item vector representations to generate a diverse subset of the pool of relevant items. For example, the diversity model 225 can implement the reformulated greedy determinant point process 226 of FIG. 2C. In doing so, the diversity model 225 may start with an identified most relevant item in the pool as a first item in the recommendation set, that is the item having the highest relevance score. The diversity model 225 can then use the reformulated greedy determinant point process 226 and the relevance scores output by the relevance model 210 to identify which item of the remaining items in the pool maximizes the combined relevance and diversity scores when added to the set including the first item, with the diversity score representing the volume occupied by the vector representations of these items in the latent product space. In special cases in which the items in the candidate pool have equal relevance scores, the reformulated greedy determinant point process 226 selects a next item to add to the set that adds a greatest volume to the volume occupied by the vector representations of these items in the latent product space. After identifying such an item, the diversity model 225 can add it to the set with the first item, thus removing it from the pool of remaining items. Next, the diversity model can use the reformulated greedy determinant point process 226 to identify which item of the remaining items in the pool maximizes the combined relevance and diversity scores when added to the set including the first and second items. This process can continue until the set reaches a predetermined size, for example twenty items, thirty items, or more.

At block 345, the recommendation engine can store the relevant, diverse set of items for future presentation to the user, or can output a user interface for presenting the set of items to the user.

Overview of Example User Interface

Figure 4:
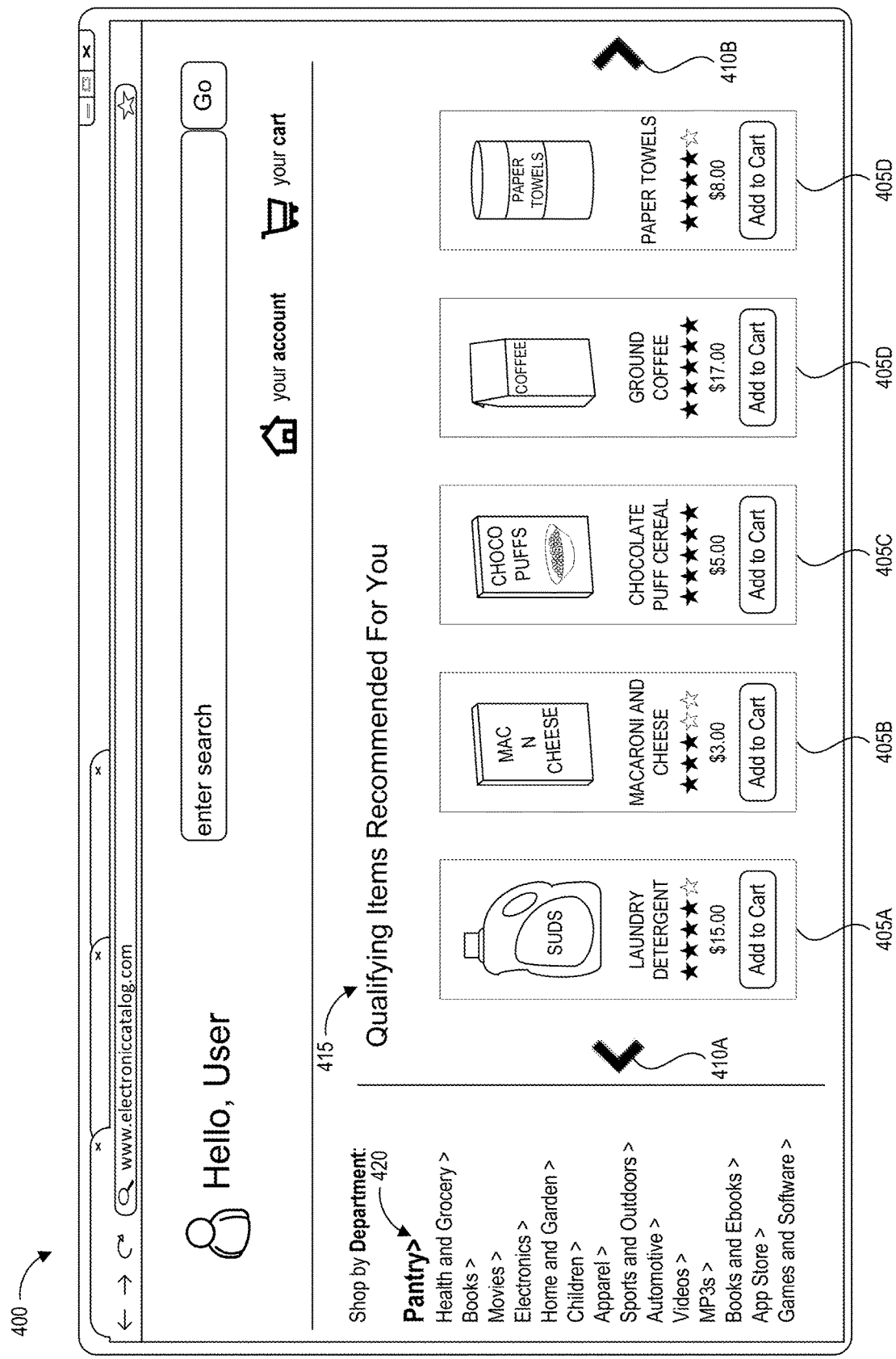
FIG. 4 depicts an example user interface including recommendations generated by the model architecture of FIG. 2A.

FIG. 4 depicts an example user interface 400 including recommendations generated by the model architecture of FIG. 2A and processes 300A, 300B of FIGS. 3A and 3B. The user interface 400 includes selectable catalog sections 420 and a recommendations carousel 415 for presenting relevant, diverse recommendations as described herein.

As shown by the bolded "Pantry" illustrated in the selectable catalog sections 420, the user is visiting the landing page of the pantry catalog section of a larger electronic catalog. As such, the recommendations carousel 415 presents representations of five pantry catalog items, identified as both relevant to the user and diverse to one another as described herein. Each recommendation includes an image of the item, the name of the item, a star rating of the item, the price of the item, and a selectable feature to add the item to the user's digital shopping cart. The carousel 415 includes navigation controls 410A, 410B for scrolling through additional recommendations. As such, only a portion of the determined set of relevant, diversified items may be presented to the user at a time, with the most relevant item presented first.

Other visual depictions of the described recommendation sets are possible, for example including other scrollable item layouts, presented in other types of user interfaces (e.g., mobile application, via email), or at other locations in the electronic catalog (e.g., as recommendations on an item detail page of a particular pantry catalog item). Further, the disclosed recommendations can be presented auditorily to the user in some embodiments, for example via an automated home assistant device. The home assistant device may provide the user with a sequential, audible description of the item names and other item information depicted in FIG. 4, as well as additional details.

Execution Environment

Figure 5:
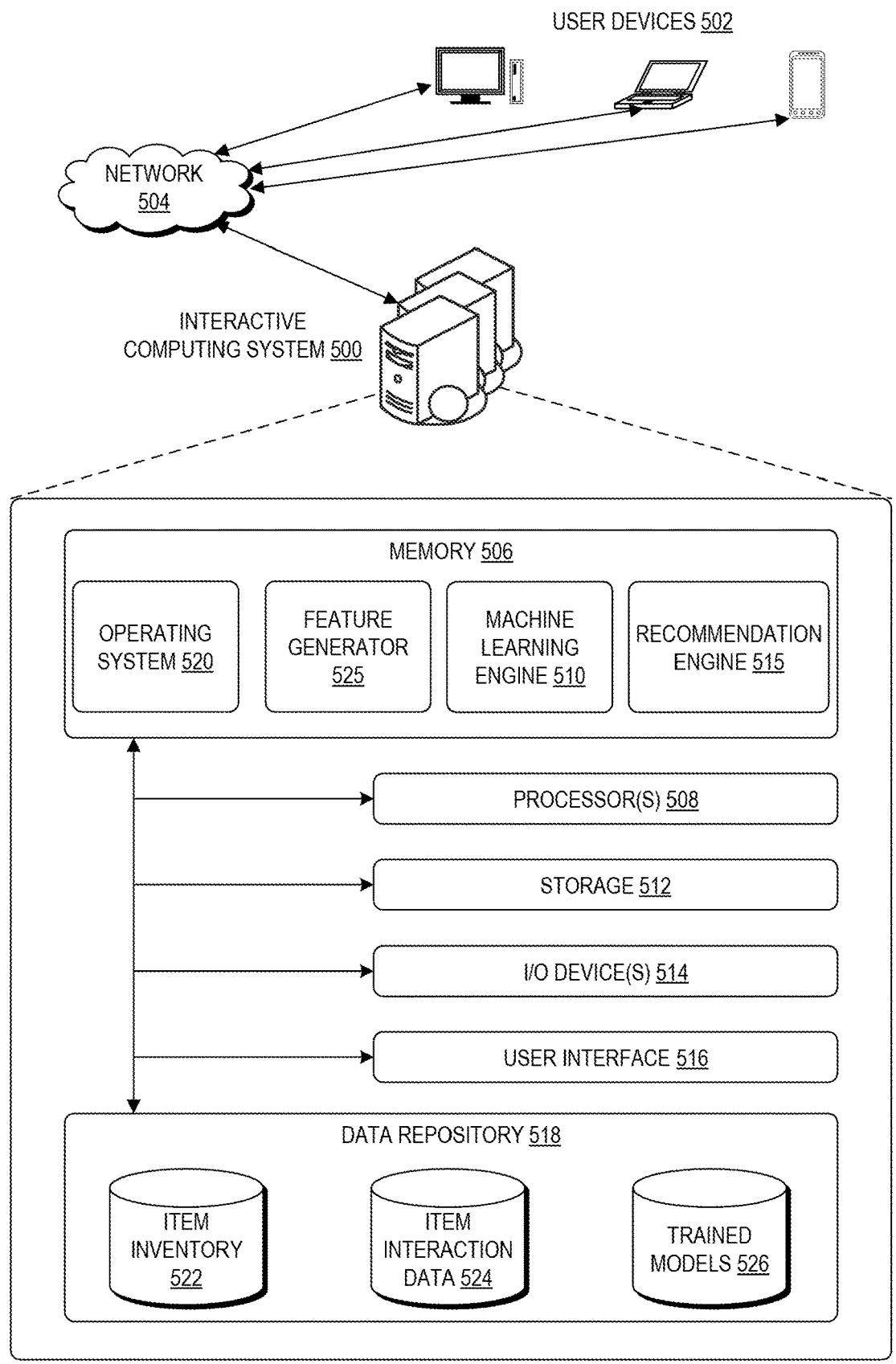
FIG. 5 is a block diagram of an illustrative computing system configured to implement training and processing of machine learning models.

FIG. 5 is a block diagram of an illustrative interactive computing system 500 configured to implement training and processing of machine learning models as described above. The architecture of the interactive computing system 500 may include a memory 506 storing an operating system 520, feature generator 525, machine learning engine 510, and recommendation engine 515, which can be in direct communication with one another or distributed among computing devices within a networked computing system and in communication with each other. Components used for the architecture may depend at least in part upon the type of network and/or environment selected.

The interactive computing system 500 may include one or more computers, perhaps arranged in a cluster of servers or as a server farm. The memory and processors that make up these computers may be located within one computer or distributed throughout many computers (including computers that are remote from one another) as detailed herein. These servers may be configured to train relevant-diverse model ensembles and manage recommendations. For example, the interactive computing system 500 may be configured to manage recommendations offered in connection with an electronic marketplace.

The interactive computing system 500 may include at least one memory 506 and one or more processing units (or processor(s)) 508. The memory 506 may include more than one memory and may be distributed throughout the interactive computing system 500. The memory 506 may store program instructions that are loadable and executable on the processor(s) 508 as well as data generated during the execution of these programs. Depending on the configuration and type of memory, the memory 506 may be volatile (such as random access memory (RAM)) and/or non-volatile (such as read-only memory (ROM), flash memory, or other memory). In some examples, the memory 506 may include multiple different types of memory, such as static random access memory (SRAM), dynamic random access memory (DRAM), or ROM. The memory can store the program instructions as a number of modules that configure processor(s) 508 to perform the various functions described herein, for example operating system 520, feature generator 525, machine learning engine 510, and recommendation engine 515.

The memory 506 may include operating system 520 for interacting with the interactive computing system 500. Interactive computing system 500 can host an interactive electronic catalog through which users can view and purchase, rent, stream, or otherwise acquire items (e.g., physical goods, digital media, and/or services).

As discussed above, the feature generator 525 may be configured to generate vectors representing user behavioral patterns and/or items. The machine learning engine 510 may be configured to implement the training described with respect FIG. 3A. The recommendation engine 515 can be configured to implement trained relevance models generated by the machine learning engine 510 together with diversity models to provide recommendations or predictions, for example to users of an electronic commerce system. The recommendation engine 515 represents the recommendation engine 200 of FIG. 2.

The processor 508 may include one or more general purpose computers, dedicated microprocessors, graphics processors, or other processing devices capable of communicating electronic information and/or training complex machine learning models. Examples of the processor 508 include one or more application-specific integrated circuits (ASICs), for example ASICs purpose built for machine learning training and/or inference, field programmable gate arrays (FPGAs), digital signal processors (DSPs) and any other suitable specific or general purpose processors. Some embodiments can use one or more graphical processing units (GPUs) as processor(s) 508 for training of the machine learning models, for example with machine learning engine 510. For example, the described neural network training can require heavy computation for metrics multiplication, and a GPU or similar processor having thousands of cores capable of parallel computing can be capable of performing daily training of a neural network, for example using a massive user-item interaction database as described herein. The processor 508 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 506 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 500 may also include input/output (I/O) device(s) and/or ports 514, such as for enabling connection with a keyboard, a mouse, a pen, a voice input device, a touch input device, a display, speakers, a printer, or other I/O device.

The interactive computing system 500 may also include a user interface 516. The user interface 516 may be utilized by a user to access portions of the interactive computing system 500. In some examples, the user interface 516 may include a graphical user interface, web-based applications, programmatic interfaces such as application programming interfaces (APIs), or other user interface configurations. The user interface 516 can include displays of the recommendations described herein.

The interactive computing system 500 may also include a data store 518. In some examples, the data store 518 may include one or more data stores, databases, data structures, or the like for storing and/or retaining information associated with the interactive computing system 500. Thus, the data store 518 may include data structures, such as an item inventory database 522, item interaction data repository 524, and trained models data repository 526.

The item inventory database 522 may be used to retain information about items available within the interactive computing system 500, for example the data of item data repository 260. As described above, items can include physical and/or digital products available for acquisition in an electronic marketplace, for example pantry catalog items. In other embodiments items can include advertisements, web pages, and other digital content. The item inventory database 522 may be updated as the selection of available items changes over time. The item interaction data repository 524 can store logged user behaviors with respect to the items currently and/or previously in the item inventory database, for example the data of the user profile features data repository 205. The trained models data repository 526 can include a one or more machine learning models trained as described herein.

The interactive computing system 500 can communicate over network 504 with user devices 502. The network 504 can include any appropriate network, including an intranet, the Internet, a cellular network, a local area network or any other such network or combination thereof. User devices 502 can include any network-equipped computing device, for example desktop computers, laptops, smartphones, tablets, e-readers, gaming consoles, and the like. Users can access the interactive computing system 500 and interact with items therein via the network 504 and can be provided with recommendations via the network 504.

Embodiments of the disclosure can be described in view of the following clauses:

1. A system comprising:
   at least one data repository storing item data representing a plurality of items of an electronic catalog and historical behavioral data of a plurality of users of the electronic catalog; and
   a machine learning system comprising one or more computing devices, the machine learning system including:
      a relevance model configured to be provided with input comprising a portion of the historical behavioral data corresponding to a user of the plurality of users and configured to provide output comprising relevance scores for the plurality of items,
      a diversity model including:
         at least one electronic memory configured to store a running index of items in a candidate pool initially including a subset of the plurality of items, vector representations of the subset of the plurality of items, the relevance scores of the subset of the plurality of items, and a running index of items in a recommendation set drawn from the candidate pool, and
         a set selector engine configured to incrementally increase a size of the recommendation set based on maximizing an objective until the recommendation set reaches a predetermined number of items, the objective including a relevance term computed based on relevance scores of the items in the recommendation set and diversity term computed based on the vector representations; and
      a user interface module configured to output a user interface presenting at least a portion of the recommendation set to the user.

2. The system of clause 1, wherein the portion of the historical behavioral data comprises a purchase history of the user, and wherein the relevance score of an item of the plurality of items represents a probability that the user will purchase the item.

3. The system of any of clauses 1 to 2, wherein the set selector engine comprises computer-executable instructions to implement a greedy determinantal point process to incrementally increase the size of the recommendation set.

4. The system of any of clauses 1 to 3, wherein a value of the diversity term represents a volume occupied in a product feature space by the vector representations of the items in the recommendation set.

5. The system of clause 4, wherein a square of the volume is equal to a determinant of a similarity matrix, the similarity matrix defined as a product of at least some of the vector representations, and wherein the diversity term is formulated to avoid computing the determinant of the similarity matrix.

6. The system of any of clauses 1 to 5, wherein the relevance model comprises a feedforward neural network trained to predict the relevance scores based on a plurality of training inputs and a corresponding plurality of expected training outputs, each training input including a vector representation of a purchase history and attributes of items in the purchase history with the corresponding expected output comprising a vector representation of at least a portion of the purchase history.

7. A non-transitory computer readable medium storing a computer-executable module that, when executed by a processor of a computing device, causes the computing device to perform a process comprising:
   accessing at least one data repository configured to store a running index of items in a candidate pool initially including a plurality of items, vector representations of the plurality of items, relevance scores of the plurality of items, and a running index of items in a recommendation set drawn from the candidate pool;
   selecting a first item to add to the recommendation set based on the relevance score of the first item being a highest relevance score of the relevance scores;

incrementally increasing a size of the recommendation set based on maximizing an objective until the recommendation set reaches a predetermined number of items, the objective including a relevance term computed based on relevance scores of the items in the recommendation set and diversity term computed based on the vector representations; and outputting a user interface presenting at least a portion of the recommendation set to a user.

8. The non-transitory computer readable medium of clause 7, wherein incrementally increasing the size of the recommendation set further comprises:

for each item remaining in the candidate pool, computing a value of the objective for the recommendation set including the item; and selecting a next item to add to the recommendation set that yields a highest value of the objective.

9. The non-transitory computer readable medium of clause 8, wherein the process further comprises decrementing the running index of items in the candidate pool to remove the next item and incrementing the running index of items in the recommendation set to include the next item.

10. The non-transitory computer readable medium of any of clauses 7 to 9, wherein the process further comprises accessing a pre-generated data repository including the vector representations of the items, wherein the vector representations are generated by a machine learning model based on item attributes including keywords in a title and a description of the item.

11. The non-transitory computer readable medium of any of clauses 7 to 10, wherein a value of the diversity term represents a volume occupied in a product feature space by the vector representations of the items in the recommendation set, wherein a square of the volume is equal to a determinant of a similarity matrix, the similarity matrix defined as a product of at least some of the vector representations, and wherein the process further comprises using a reformulated update equation for the diversity term to avoid computing the determinant of the similarity matrix.

12. The non-transitory computer readable medium of any of clauses 7 to 11, wherein the process further comprises computing the relevance scores using a relevance model.

13. The non-transitory computer readable medium of clause 12, wherein the relevance model comprises a feedforward neural network trained to predict the relevance scores based on a plurality of training inputs and a corresponding plurality of expected training outputs, each training input including a vector representation of a purchase history and attributes of items in the purchase history with the corresponding expected output comprising a vector representation of at least a portion of the purchase history, wherein the process further comprises training the feedforward neural network to predict the relevance scores.

14. A computer-implemented method comprising, under control of one or more computing devices configured with specific computer-executable instructions:

accessing at least one data repository storing a running index of items in a candidate pool initially including a plurality of items, relevance scores of the plurality of items, and a running index of items in a recommendation set drawn from the candidate pool;

selecting a first item to add to the recommendation set based on the relevance score of the first item being a highest relevance score of the relevance scores;

accessing vector representations of the plurality of items, wherein the vector representations are mappable to a multi-dimensional vector space;

selecting a second item to add to the recommendation set by at least:

for individual items of the plurality of items remaining in the candidate pool, evaluating the recommendation set including the item by computing a measure of a volume occupied by the vector representations of the item and the first item in the multi-dimensional vector space, and selecting the second item based on having a highest objective score determined at least partly on the measure of the volume occupied by the vector representations of the first item and the second item in the multi-dimensional vector space;

incrementally increasing a size of the recommendation set based on measures of the volume occupied by the vector representations of the items in the recommendation set until the recommendation set reaches a predetermined number of items; and outputting a user interface presenting at least a portion of the recommendation set to a user.

15. The method of clause 14, wherein selecting the second item is additionally based on a combination of the relevance scores of the first and second items.

16. The method of clause 15, further comprising identifying items from the candidate pool to add to the recommendation set based on maximizing an objective, the objective including a relevance term computed based on relevance scores of the items in the recommendation set and diversity term computed based on the vector representations.

17. The method of clause 16, wherein a determinant of a similarity matrix represents the volume occupied in the multi-dimensional vector space by the vector representations of the items in the recommendation set, the similarity matrix defined as a product of at least some of the vector representations, and wherein the method further comprises using a reformulated update equation for the diversity term to avoid computing the determinant of the similarity matrix.

18. The method of any of clauses 14 to 17, further comprising accessing the vector representations of the items from a pre-generated data repository, wherein the vector representations are generated by a machine learning model based on item attributes including keywords in a title and a description of the item.

19. The method of any of clauses 14 to 18, further comprising computing the relevance scores using a relevance model.

20. The method of clause 19, wherein the relevance model comprises a feedforward neural network trained to predict the relevance scores based on a plurality of training inputs and a corresponding plurality of expected training outputs, each training input including a vector representation of a purchase history and attributes of items in the purchase history with the corresponding expected output comprising a vector representation of at least a portion of the purchase history, and wherein the method further comprises training the feedforward neural network to predict the relevance scores.

21. A system comprising:

at least one data repository storing:

first item data representing a plurality of items of an electronic catalog, wherein a subset of the plurality of items are consumable items, second item data representing a plurality of additional items of a subset catalog of the electronic catalog, wherein the plurality of additional items are consumable items, and historical purchase data of a plurality of users of one or both of the electronic catalog and the subset catalog; and a machine learning system comprising one or more computing devices, the machine learning system including:

an artificial neural network including:

an input layer configured to be provided with input comprising purchases of a user from the subset catalog, purchases of the user of the consumable items of the electronic catalog, and attributes of items purchased by the user from one or both of the electronic catalog and the subset catalog, at least one hidden layer configured to transform the input using parameters learned during training, and an output layer configured to provide relevance scores of a selection of the plurality of additional items of the subset catalog;

a diversity model configured to generate a recommendation set by reranking a subset of the selection of the plurality of additional items based on maximizing a diversity objective; and a user interface module configured to output a user interface presenting at least a portion of the recommendation set to the user.

22. The system of clause 21, wherein the attributes include brands, keywords, and categories of the items purchased by the user, and wherein the input comprises a vector representation of the purchases of a user from the subset catalog, the purchases of the user of the consumable items of the electronic catalog, the brands, the keywords, and the categories.

23. The system of any of clauses 21 to 22, wherein a purchase history of the user includes no purchases from the subset catalog, and wherein the parameters of the artificial neural network are configured to leverage the purchases of the user of the consumable items of the electronic catalog and the attributes of items purchased by the user from the electronic catalog such that the artificial neural network can provide the relevance scores of the selection of the plurality of additional items of the subset catalog.

24. The system of any of clauses 21 to 23, wherein the subset catalog comprises a pantry catalog.

25. The system of any of clauses 21 to 24, wherein the relevance score of an item of the plurality of additional items represents a probability that the user will purchase the item.

26. The system of any of clauses 21 to 25, wherein the diversity model includes:

a data repository configured to store a running index of items in a candidate pool initially including a subset of the selection of the plurality of additional items, vector representations of the items in the subset, the relevance scores of the items in the subset, and a running index of items in the recommendation set drawn from the candidate pool, and a set selector engine configured to incrementally increase a size of the recommendation set based on iteratively maximizing the diversity objective until the recommendation set reaches a desired set size, the objective including a relevance term computed based on relevance scores of the items in the recommendation set and diversity term computed based on the vector representations.

27. A non-transitory computer readable medium storing a computer-executable module that, when executed by a processor of a computing device, causes the computing device to perform a process comprising:

accessing an artificial neural network trained to generate relevance scores for a plurality of items of a first electronic catalog based on an input vector representing (i) first interactions between a user and items of the first electronic catalog, (ii) second interactions between the user and items of a second electronic catalog, wherein at least some items of the second electronic catalog have at least one common attribute with at least some items of the first electronic catalog, and (iii) attributes of items in one or both of the first and second electronic catalogs with which the user has interacted;

identifying an interaction history of the user, wherein the interaction history includes interactions between the user and items of one or both of the first and second electronic catalogs;

generating the input vector based on the interaction history of the user;

transforming the input vector into the relevance scores for the plurality of items of the first electronic catalog using the artificial neural network;

using the relevance scores and a diversity objective to generate a recommendation set; and outputting a user interface presenting at least a portion of the recommendation set to the user.

28. The non-transitory computer readable medium of clause 27, wherein the process further comprises identifying the interactions from a purchase history of the user.

29. The non-transitory computer readable medium of clause 28, wherein the purchase history of the user includes a purchase of at least one item from the second catalog and no purchases from the first catalog, and wherein the artificial neural network leverages the purchase of the at least one item from the second catalog and the attributes of the at least one item to provide the relevance scores of the plurality of items of the first electronic catalog.

30. The non-transitory computer readable medium of any of clauses 27 to 29, wherein the process further comprises identifying the attributes based on brands, keywords, and categories of items purchased by the user.

31. The non-transitory computer readable medium of clause 30, the process further comprising generating the input vector to represent items purchased by the user from the first catalog, items purchased by the user from the second catalog, the brands, the keywords, and the categories.

32. The non-transitory computer readable medium of any of clauses 27 to 31, the process further comprising incrementally increasing a number of items in of the recommendation set using a diversity model by:

adding, to the recommendation set, an initial item of the plurality of items having a highest relevance score, and iteratively adding an additional item to the recommendation set based on maximizing a diversity objective until the recommendation set reaches a predetermined number of items.

33. The non-transitory computer readable medium of clause 32, wherein iteratively adding the additional item to the recommendation set comprises:

for individual items of a subset of the plurality of items remaining in a candidate pool, computing a value of the objective for the recommendation set including the item; and selecting a next item to add to the recommendation set that yields a highest value of the objective.

34. The non-transitory computer readable medium of any of clauses 32 to 33, the process further comprising accessing vector representations of the items generated based on item attributes including keywords in a title and a description of the item.

35. The non-transitory computer readable medium of clause 34, wherein a term of the diversity objective represents a volume occupied in a product feature space by the vector representations of the items in the recommendation set, wherein a square of the volume is equal to a determinant of a similarity matrix defined as a product of vector representations of the items in the recommendation set, and wherein the process further comprises using a reformulated update equation for the term to avoid computing the determinant of the similarity matrix.

36. A computer-implemented method comprising, under control of one or more computing devices configured with specific computer-executable instructions:

accessing a machine learning model trained to generate relevance scores for a plurality of items of a first electronic catalog based on input representing (i) first interactions between a user and first items of the first electronic catalog, (ii) second interactions between the user and second items of a second electronic catalog, and (iii) attributes of at least the second items;

identifying an interaction history of the user;

generating the input based on the interaction history of the user;

transforming the input into the relevance scores for the plurality of items of the first electronic catalog using the machine learning model;

using the relevance scores and a diversity objective to generate a recommendation set; and outputting a user interface presenting at least a portion of the recommendation set to the user.

37. The method of clause 36, wherein the interaction history of the user indicates that the has interacted with at least one item from the second catalog and has not interacted with any items from the first catalog, and wherein the machine learning model leverages a vector representation of the at least one item from the second catalog and the attributes of the at least one item to provide the relevance scores of the plurality of items of the first electronic catalog.

38. The method of any of clauses 36 to 37, further comprising identifying the attributes based on brands, keywords, and categories of the second items.

39. The method of any of clauses 36 to 38, further comprising generating an input vector representing the first interactions, the second interactions, and the attributes.

40. The method clause 39, further comprising generating vector representations of the first and second interactions based at least partly on frequency and recency of interactions with the first and second items.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially. Certain described tasks may be implemented by processors that are remote from one another, for example in separate server towers and/or geographically remote.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller or microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising, under control of one or more computing devices configured with specific computer-executable instructions:
    training a machine learning model to generate, for a target user, relevance scores for a plurality of items of a first electronic catalog based at least partly on interactions of the target user with a second electronic catalog, wherein training the machine learning model comprises providing a plurality of user-specific training datasets to the machine learning model, each training dataset corresponding to a respective user that has made a purchase from the first electronic catalog, each training dataset comprising (i) expected output data representing one or more items purchased by the respective user from the first electronic catalog, and (ii) input data representing additional interactions of the respective user with items, including interactions with items included in the second electronic catalog but not the first catalog;
    identifying an interaction history of the target user, said interaction history including interactions of the target user with items in the second electronic catalog, said interaction history not including any purchases from the first electronic catalog;
    generating input based on the interaction history of the target user;
    transforming the input into the relevance scores for the plurality of items of the first electronic catalog using the trained machine learning model;
    using the relevance scores and a diversity objective to generate a recommendation set, said recommendation set consisting of a subset of the plurality of items of the first electronic catalog; and
    outputting a user interface presenting at least a portion of the recommendation set to the target user.

2. The method of claim 1, wherein the machine learning model comprises a neural network.

3. The method of claim 1, wherein using the relevance scores and the diversity objective to generate a recommendation set comprises:
    selecting first and second items of the first electronic catalog based on the relevance scores;
    generating a vector representation of the first item, said vector representation of the first item comprising values representing attributes of the first item;
    generating a vector representation of the second item, said vector representation of the second item comprising values representing attributes of the second item; and
    calculating an area formed by the vector representations of the first and second items, said area representing a degree to which the first and second items are diverse.

4. The method of claim 1, wherein the machine learning model is trained offline, and is used in an online mode to generate real time recommendations for users.

5. The method of claim 1, wherein training the machine learning model comprises generating vector representations of said expected output data and input data, and providing said vector representations to the machine learning model.

6. The method of claim 1, wherein generating the input based on the interaction history of the target user comprises generating vector representations of selected features of the target user based on said interaction history.

7. The method of claim 1, wherein the input is based on both purchase interactions and non-purchase interactions of the target user with the items included in the second electronic catalog.

8. A computing system comprising one or more computing devices programmed with executable instructions, said computing system configured to implement a process that comprises:
    training a machine learning model to generate, for a target user, relevance scores for a plurality of items of a first electronic catalog based at least partly on interactions of the target user with a second electronic catalog, wherein training the machine learning model comprises providing a plurality of user-specific training datasets to the machine learning model, each training dataset corresponding to a respective user that has made a purchase from the first electronic catalog, each training dataset comprising (i) expected output data representing one or more items purchased by the respective user from the first electronic catalog, and (ii) input data representing additional interactions of the respective user with items, including interactions with items included in the second electronic catalog;
    identifying an interaction history of the target user, said interaction history including interactions of the target user with items in the second electronic catalog, said interaction history not including any purchases from the first electronic catalog;

generating input based on the interaction history of the target user;

transforming the input into the relevance scores for the plurality of items of the first electronic catalog using the trained machine learning model;

using the relevance scores and a diversity objective to generate a recommendation set, said recommendation set consisting of a subset of the plurality of items of the first electronic catalog; and outputting a user interface presenting at least a portion of the recommendation set to the target user.

9. The computing system of claim 8, wherein the machine learning model comprises a neural network.

10. The computing system of claim 8, wherein the computing system is configured to use the relevance scores and the diversity objective to generate the recommendation set by at least:

selecting first and second items based on the relevance scores;

generating a vector representation of the first item, said vector representation of the first item comprising values representing attributes of the first item;

generating a vector representation of the second item, said vector representation of the second item comprising values representing attributes of the second item; and calculating an area formed by the vector representations of the first and second items, said area representing a degree to which the first and second items are diverse.

11. The computing system of claim 8, wherein the computing system is configured to train the machine learning model offline, and to use the trained machine learning model in an online mode to generate real time recommendations for users.

12. The computing system of claim 8, wherein the computing system is configured to train the machine learning model by a process that comprises generating vector representations of said expected output data and input data, and providing said vector representations to the machine learning model.

13. The computing system of claim 8, wherein the computing system, in generating the input based on the interaction history of the target user, is configured to generate vector representations of selected features of the target user based on said interaction history.

14. The computing system of claim 8, wherein the input is based on both purchase interactions and non-purchase interactions of the target user with items included in the second electronic catalog.

* * * * *